US008766953B1

(12) United States Patent
Cheatham, III et al.

(10) Patent No.: US 8,766,953 B1
(45) Date of Patent: Jul. 1, 2014

(54) TACTILE DISPLAY DRIVEN BY SURFACE ACOUSTIC WAVES

(71) Applicant: Elwha LLC, Bellevue, WA (US)

(72) Inventors: Jesse R. Cheatham, III, Seattle, WA (US); William Gates, Medina, WA (US); Roderick A. Hyde, Redmond, WA (US); Muriel Y. Ishikawa, Livermore, CA (US); Jordin T. Kare, Seattle, WA (US); Nathan P. Myhrvold, Medina, WA (US); Tony S. Pan, Cambridge, MA (US); Robert C. Petroski, Seattle, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/929,337

(22) Filed: Jun. 27, 2013

(51) Int. Cl.
*G06F 3/043* (2006.01)

(52) U.S. Cl.
USPC .......................... 345/177; 178/19.02; 310/317

(58) Field of Classification Search
CPC ..... G06F 3/043; G06F 3/0433; G06F 3/0436; G06F 3/016; H03H 9/1007; H03H 9/1042; H03H 9/105; H03H 9/1057; H03H 9/1064; H03H 9/1071; H03H 9/1078; H03H 9/1092; H03H 9/64
USPC ............ 345/156–176, 177; 340/407.1–407.2; 310/313 R–313 D, 320–323.21, 334, 310/316.01, 317; 178/18.04, 19.02
See application file for complete search history.

(56) References Cited

U.S. PATENT DOCUMENTS

| 5,235,982 | A | 8/1993 | O'Donnell | |
|---|---|---|---|---|
| 6,330,827 | B1 | 12/2001 | Johnson et al. | |
| 7,292,151 | B2 | 11/2007 | Ferguson et al. | |
| 7,492,268 | B2 | 2/2009 | Ferguson et al. | |
| 2007/0024593 | A1* | 2/2007 | Schroeder | 345/173 |
| 2009/0284485 | A1* | 11/2009 | Colgate et al. | 345/173 |
| 2010/0026667 | A1 | 2/2010 | Bernstein | |
| 2010/0231550 | A1 | 9/2010 | Cruz-Hernandez et al. | |
| 2011/0090070 | A1* | 4/2011 | Modarres et al. | 340/407.2 |
| 2011/0199342 | A1 | 8/2011 | Vartanian et al. | |
| 2011/0260988 | A1 | 10/2011 | Colgate et al. | |
| 2012/0274609 | A1 | 11/2012 | Sheng et al. | |
| 2012/0274610 | A1 | 11/2012 | Dahl | |
| 2013/0113760 | A1* | 5/2013 | Gossweiler et al. | 345/177 |
| 2013/0127755 | A1 | 5/2013 | Lynn et al. | |

OTHER PUBLICATIONS

"Airborne Ultrasound Tactile Display", SIGGRAPH, 2008, pp. 1-2, http://www.siggraph.org/s2008/attendees/newtech/9.php, ACM SIGGRAPH.

(Continued)

*Primary Examiner* — Liliana Cerullo

(57) ABSTRACT

Described embodiments include a system and a method. A system includes an ultrasound transmitter acoustically coupled to an ultrasound-conducting layer of a display surface and configured to deliver a down-modulated ultrasound wave to a first delineated area of at least two delineated areas of the display surface. The down-modulated ultrasound wave when delivered having a power density producing a stress pattern directly perceivable or discernible by a human appendage touching the first delineated area. The system includes a controller configured to initiate a delivery of the down-modulated ultrasound wave to the first delineated area by the ultrasound transmitter in response to an indication of a detected touch by the human appendage to at least a portion of the first delineated area.

30 Claims, 19 Drawing Sheets

(56) References Cited

OTHER PUBLICATIONS

"Beam Steering", Olympus, 2013, pp. 1-3, http://www.olympus-ims.com/en/ndt-tutorials/transducers/pa-beam/steering/, Olympus Corporation.

Hoshi et al., "Non-contact Tactile Sensation Synthesized by Ultrasound Transducers", Third Joint Eurohaptics Conference and Symposium on Haptic Interfaces for Virtual Environment and Teleoperator Systems, Mar. 18-20, 2009, pp. 256-260, IEEE.

"Leap Motion", printed on May 31, 2013, pp. 1-7, Leap Motion, Inc., https://leapmotion.com/product.

"Linear Arrays", printed on May 10, 2013, pp. 1-2, http://www.ob-ultrasound.net/lineararrays.html.

Mezil et al., "All-optical probing of the nonlinear acoustics of a crack", Optics Letters, Sep. 1, 2011, pp. 3449-3451, vol. 36, No. 17, Optical Society of America.

Nara et al., "Surface Acoustic Wave Tactile Display", IEEE Computer Graphics and Applications, Nov./Dec. 2001, pp. 56-63, IEEE.

"Nonlinear acoustics", Wikipedia, the free encyclopedia, printed on May 2, 2013, pp. 1-4, http://en.wikipedia.org/wiki/Nonlinear_acoustics.

Orland, Kyle, "Leap Motion promises Kinect-beating 3D tracking", Ars Technica, May 21, 2012, pp. 1-3, Condé Nast.

Urban et al., "Modulation of ultrasound to produce multifrequency radiation force", The Journal of the Acoustical Society of America, Mar. 2010, pp. 1228-1238,, vol. 127, No. 3, Acoustical Society of America.

* cited by examiner

13/19

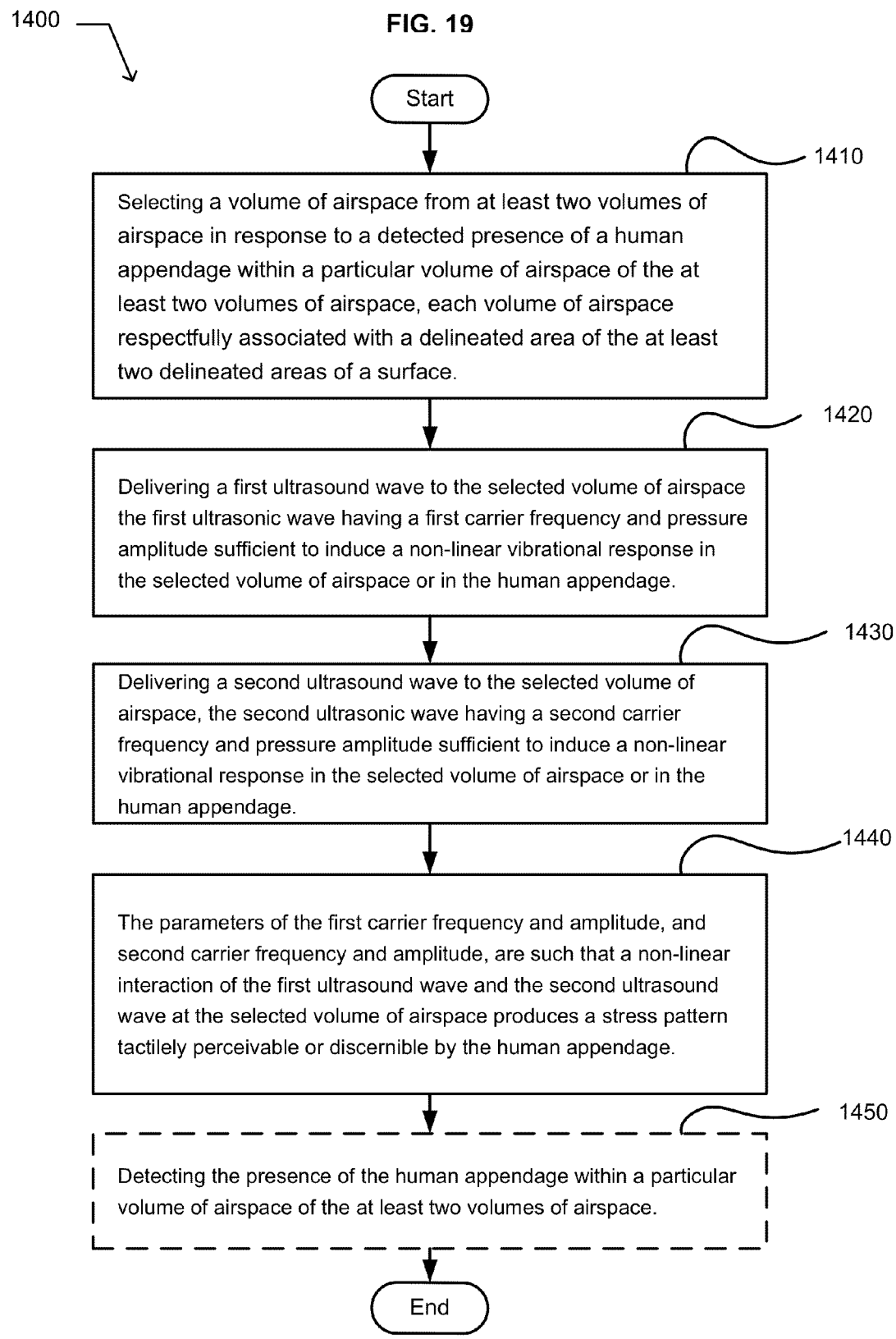

TACTILE DISPLAY DRIVEN BY SURFACE ACOUSTIC WAVES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None.

RELATED APPLICATIONS

U.S. patent application Ser. No. 13/929,387, entitled TACTILE FEEDBACK GENERATED BY NON-LINEAR INTERACTION OF SURFACE ACOUSTIV WAVES, naming Jesse R. Cheatham, III, William Gates, Roderick A. Hyde, Muriel Y. Ishikawa, Jordin T. Kare, Nathan P. Myhrvold, Tony S. Pan, Robert C. Petroski, Lowell L. Wood, Jr., and Victoria Y. H. Wood as inventors, filed Jun. 27, 2013 is related to the present application.

U.S. patent application Ser. No. 13/929,488, entitled TACTILE FEEDBACK GENERATED BY PHASE CONJUGATION OF ULTRASOUND SURFACE ACOUSTIC WAVES, naming Jesse R. Cheatham, III, William Gates, Roderick A. Hyde, Muriel Y. Ishikawa, Jordin T. Kare, Nathan P. Myhrvold, Tony S. Pan, Robert C. Petroski, Lowell L. Wood, Jr., and Victoria Y. H. Wood as inventors, filed Jun. 27, 2013 is related to the present application.

U.S. patent application Ser. No. 13/929,543, entitled TACTILE FEEDBACK IN A TWO OR THREE DIMENSIONAL AIRSPACE, naming Jesse R. Cheatham, III, William Gates, Roderick A. Hyde, Muriel Y. Ishikawa, Jordin T. Kare, Nathan P. Myhrvold, Tony S. Pan, Robert C. Petroski, Lowell L. Wood, Jr., and Victoria Y. H. Wood as inventors, filed Jun. 27, 2013 is related to the present application.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes a system. The system includes an ultrasound transmitter acoustically coupled to an ultrasound-conducting layer of a display surface and configured to deliver a down-modulated ultrasound wave to a first delineated area of at least two delineated areas of the display surface. The down-modulated ultrasound wave having a power density producing a stress pattern directly perceivable or discernible by a human appendage touching the first delineated area. The system includes a controller configured to initiate a delivery of the down-modulated ultrasound wave to the first delineated area by the ultrasound transmitter in response to an indication of a detected touch by the human appendage to at least a portion of the first delineated area.

In an embodiment, the system includes a touch tracking device configured to detect a touch by the human appendage to at least a portion of the first delineated area. In an embodiment, the ultrasound transmitter includes a first ultrasound transmitter and a second ultrasound transmitter. The first ultrasound transmitter is acoustically coupled to an ultrasound-conducting layer of a display surface and configured to deliver a first down-modulated ultrasound wave to a first delineated area of at least two delineated areas of the display surface. The first down-modulated ultrasound wave having a power density producing a first stress pattern directly perceivable or discernible by a human appendage touching the first delineated area. The second ultrasound transmitter is acoustically coupled to the ultrasound-conducting layer of the display surface and configured to deliver a second down-modulated ultrasound wave to a second delineated area of the at least two delineated areas of the display surface. The second down-modulated ultrasound wave having a power density producing a second stress pattern directly perceivable or discernible by the human appendage touching the second delineated area. In an embodiment, the system includes a third ultrasound transmitter acoustically coupled to the ultrasound-conducting layer of a display surface and configured to deliver a third down-modulated ultrasound wave to a third delineated area of the display surface, the third down-modulated ultrasound wave having a power density producing a stress pattern directly perceivable or discernible by the human appendage touching the third delineated area.

For example, and without limitation, an embodiment of the subject matter described herein includes a method. The method includes detecting a first touch by a first human appendage to at least a portion of a first delineated area of a display surface having at least two delineated areas. The method includes activating a first ultrasound transmitter acoustically coupled to an ultrasound-conducting layer of the display surface and configured to deliver a first down-modulated ultrasound wave to the first delineated area. The first down-modulated ultrasound wave having a first power density producing a stress pattern directly perceivable or discernible by the first human appendage touching the first delineated area. In an embodiment, the method includes retrieving or selecting the down-modulation pattern from a lookup table in response to the detected touch. In an embodiment, the method includes detecting a second touch by a second human appendage to at least a portion of a second delineated area of the display surface, and activating a second ultrasound transmitter coupled to the ultrasound-conducting layer and configured to deliver a second down-modulated ultrasound wave to the second delineated area. The second down-modulated ultrasound wave having a second power density producing second stress pattern directly perceivable or discernible by the second human appendage touching the second delineated area.

For example, and without limitation, an embodiment of the subject matter described herein includes a system. The system includes a steered-beam ultrasound transmitter acoustically coupled to an ultrasound-conducting layer of a display surface and configured to deliver a down-modulated ultrasound wave to a delineated area selected from at least two delineated areas of the display surface. The down-modulated ultrasound wave having a power density producing a stress pattern directly perceivable or discernible by a human appendage touching the selected delineated area. The system includes a controller configured to select a delineated area from the at least two delineated areas in response to a location of a detected touch by the human appendage to the display surface. The controller configured to initiate a delivery of the down-modulated ultrasound wave to the selected delineated area by the steered-beam ultrasound transmitter. In an embodiment, the system includes a touch tracking device configured to detect a touch by the human appendage to at least a portion of the first delineated area or to at least a portion of the second delineated area.

For example, and without limitation, an embodiment of the subject matter described herein includes a method. The method includes detecting a touch by a human appendage to at least a portion of a delineated area of a display surface having at least two delineated areas. The method includes targeting the touched delineated area for delivery of a down-modulated ultrasound wave by a steered-beam ultrasound transmitter, the steered-beam ultrasound transmitter acoustically coupled to an ultrasound-conducting layer of the display surface and configured to deliver a down-modulated ultrasound wave to a delineated area selected from at least two delineated areas. The down-modulated ultrasound wave having a power density producing a stress pattern directly perceivable or discernible by the human appendage touching the selected delineated area. The method includes delivering the down-modulated ultrasound wave to the touched delineated area by the steered-beam ultrasound transmitter. In an embodiment, the method includes retrieving or selecting the down-modulation pattern from a lookup table in response to the detected touch.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 19 illustrates an example operational flow 1400.

DETAILED DESCRIPTION

Figure 1:
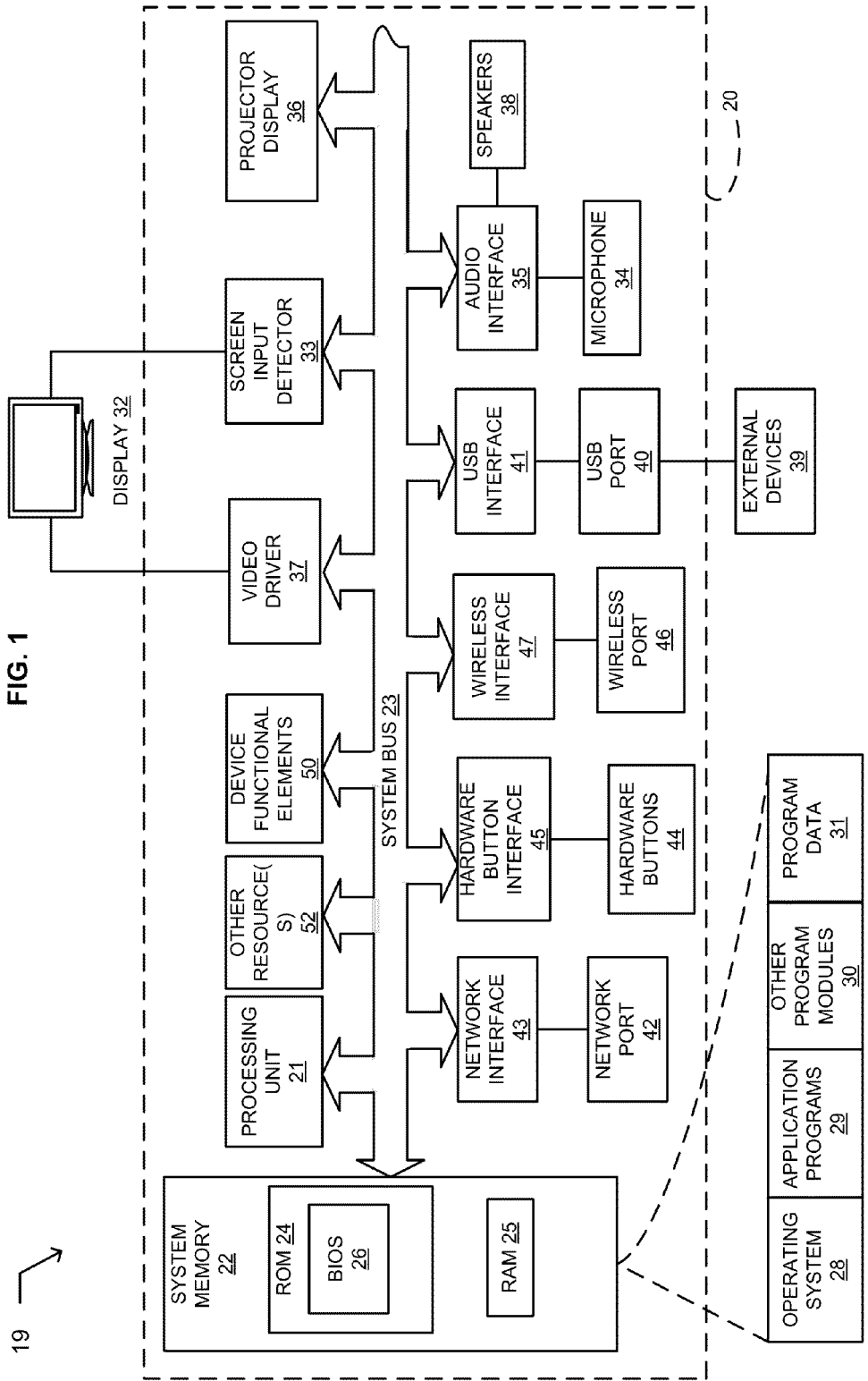
FIG. 1 illustrates an example embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
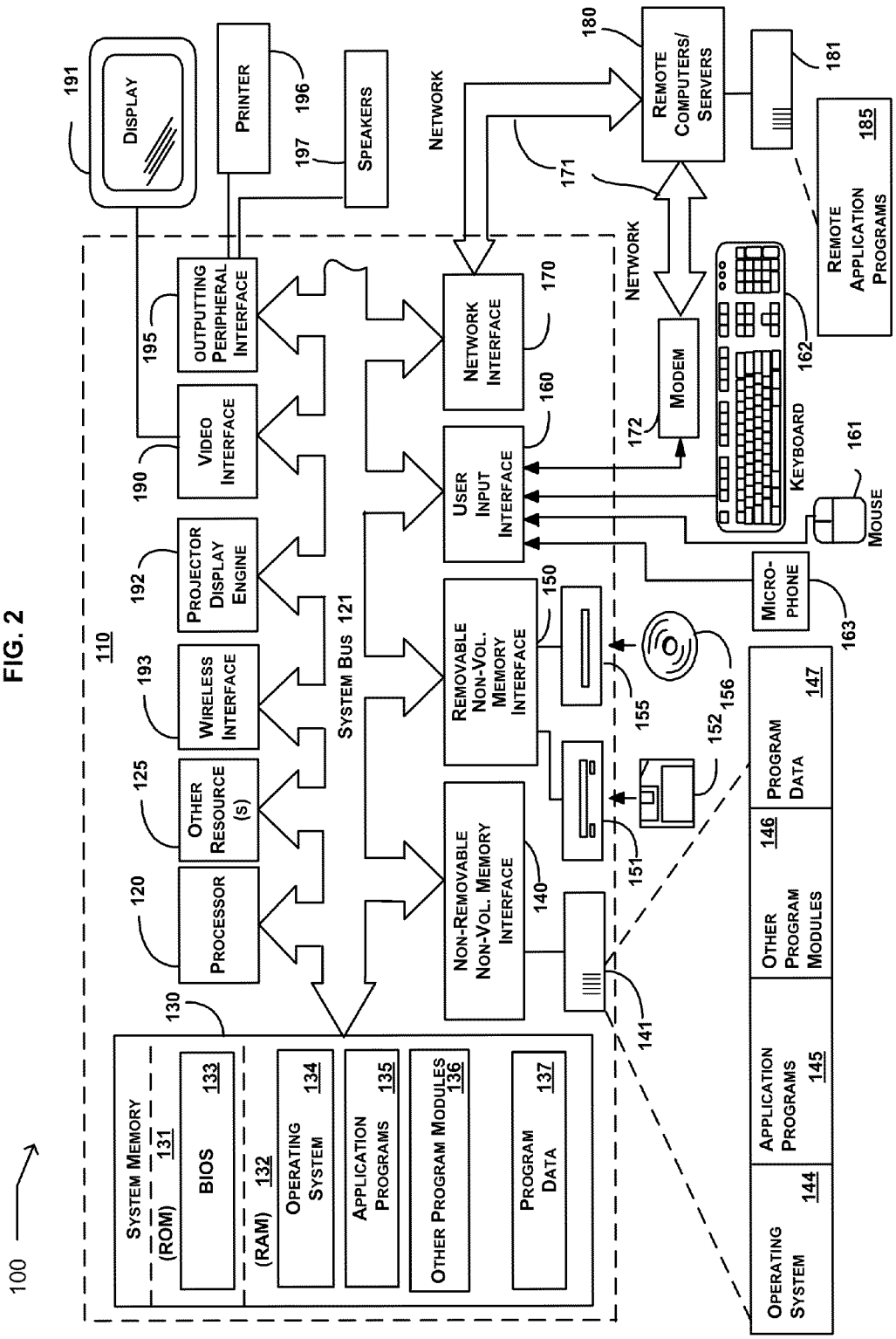
FIG. 2 illustrates an example embodiment of a general-purpose computing system in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive screen or display surface, or one or more switches or buttons with suitable input detection circuitry. A touch-sensitive screen or display surface is illustrated as a touch-sensitive display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS"® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch-sensitive screen or display surface, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing a communication link between the computers may be used.

In certain instances, one or more elements of the computing device 110 may be deemed not necessary and omitted. In other instances, one or more other elements may be deemed necessary and added to the computing device.

To aid a user's operation of a touch-sensitive display, it is advantageous to provide feedback to the user, confirming that the display recognizes a touch contact or motion. Haptic feedback is often a preferable feedback mode as it more closely corresponds to the touch action being performed. Haptic feedback can be provided by vibrating the display surface so as to impart a humanly perceivable stress (pressure or shear) to a finger of the user. However, in delivering such a vibration, a designer faces a challenge; the frequencies which are best perceived by humans as stress are at low frequencies, e.g., 1 kHz or lower, but such frequencies have long wavelengths, e.g., 1 meter or above. As a result, it is difficult to localize the vibrations to the specific location on the display being touched; hence such tactile feedback is often delivered without localization, by vibrating the entire screen. Such a global vibration expends more energy than would a vibration localized to the touch location, thereby using more battery energy. It is also apparent that users operating a multi-touch display would benefit from receiving localized and distinct tactile feedback at each contacting finger, rather than a single undifferentiated feedback. Vibrations at ultrasound frequencies do provide short enough wavelengths to be well localized at touch contact sites within a display surface, but humans to not perceive such high frequency vibrations as readily as lower (difficult to localize) ones. It is therefore advantageous to combine the localization of ultrasound frequency vibrations with the human perceivability of acoustic frequency vibrations.

Figure 3:
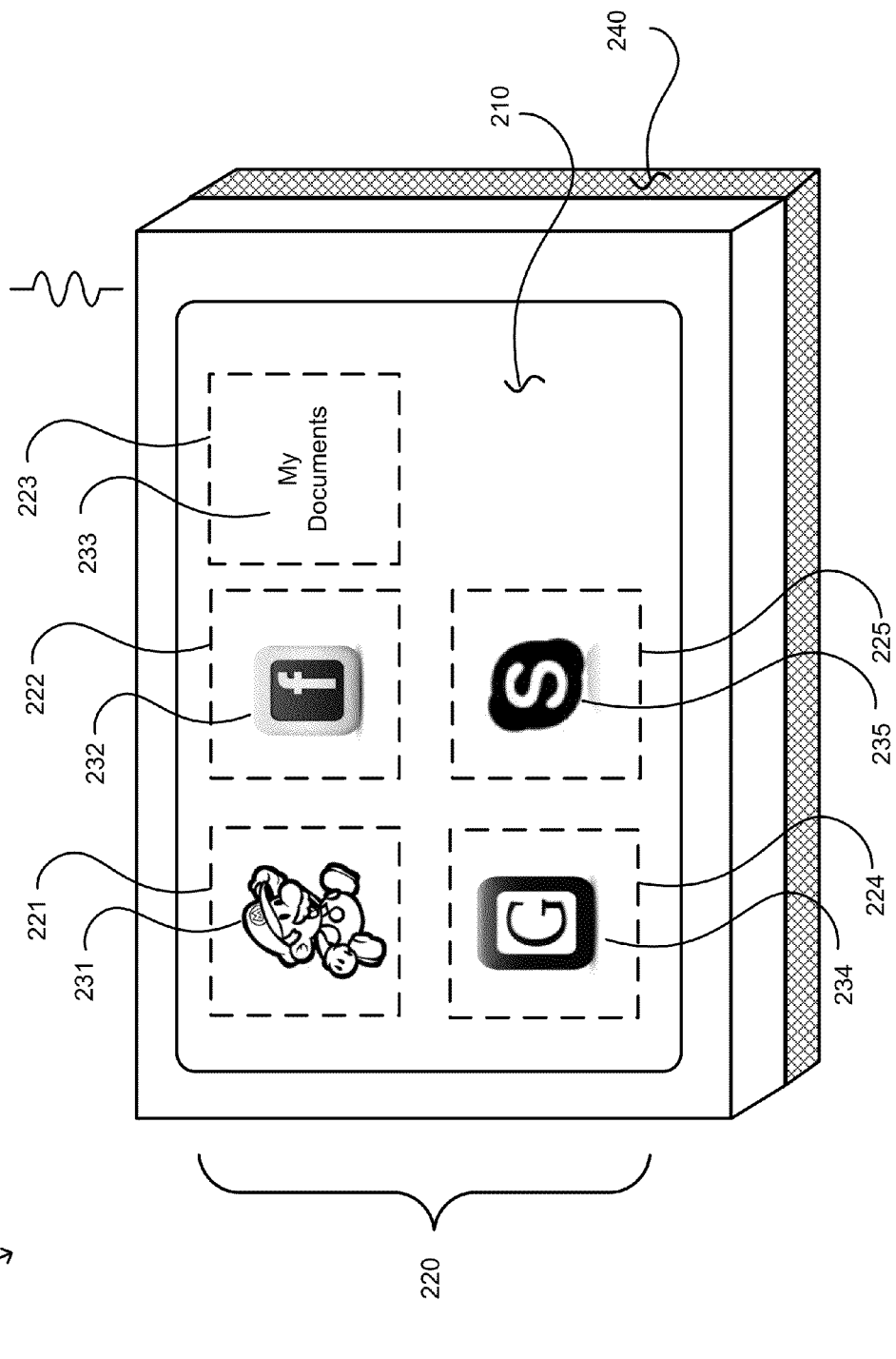
FIGS. 3 and 4 illustrate an example system 200 in which embodiments may be implemented.
Figure 4:
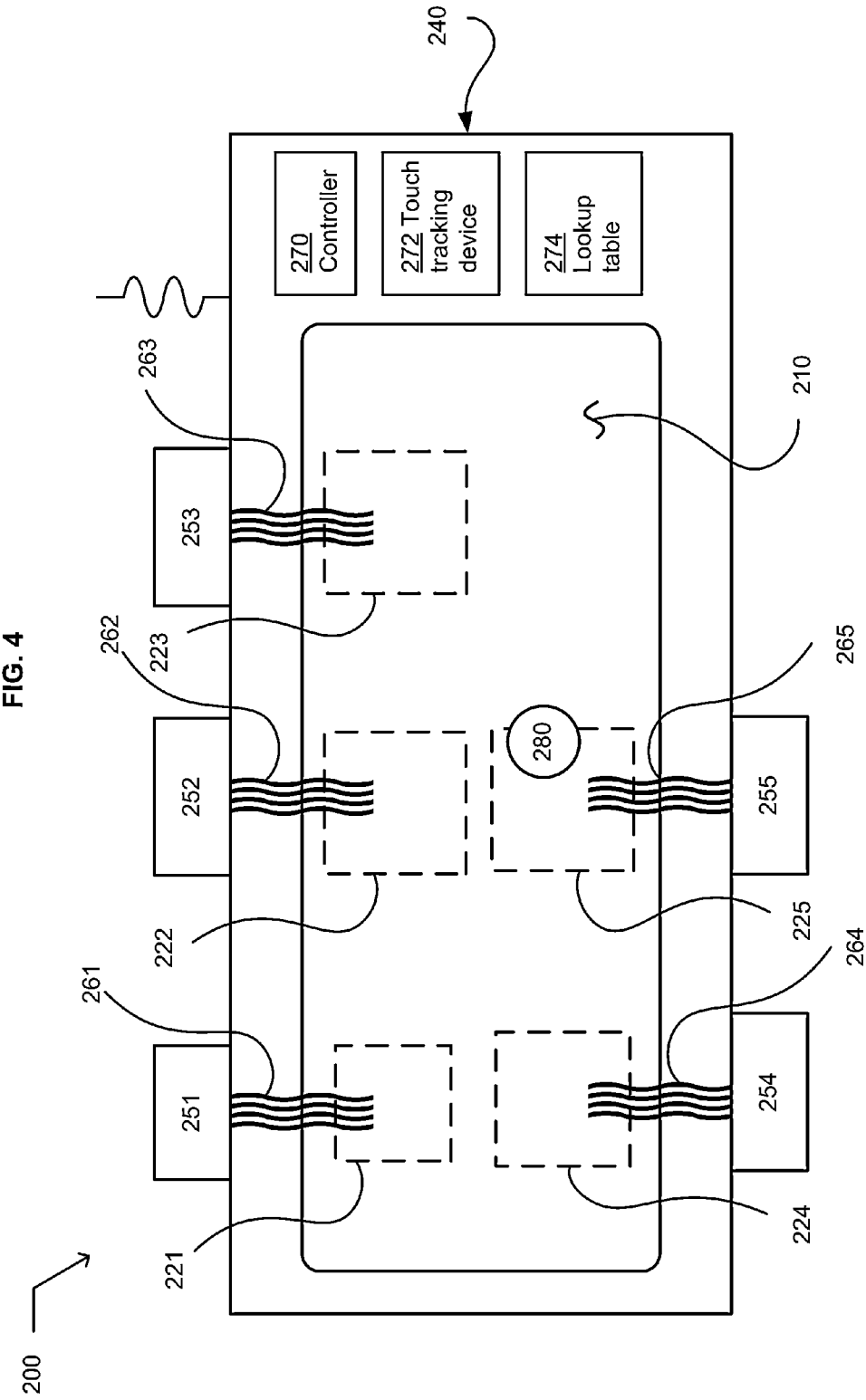

FIGS. 3 and 4 illustrate an example system 200 in which embodiments may be implemented. FIG. 3 illustrates a display surface 210 of the system having at least two delineated areas 220. In an embodiment, the display surface includes a touch-sensitive display surface having at least two touch-selectable delineated areas. In an embodiment, the display surface includes a touch-sensitive display surface of a mobile or a stationary computing device. In an embodiment, the display surface includes a touch-sensitive display surface of a computing device mounted in a vehicle, aircraft, or vessel. The at least two delineated area are illustrated by delineated areas 221-225. The illustrated embodiment also includes widgets 231-235 displayed in a positional relationship or spatial association with the delineated touch-selectable areas 221-225. In an embodiment, widgets include icons, pull-down menus, buttons, selection boxes, progress indicators, on-off checkmarks, scroll bars, windows, window edges (that let you resize the window), toggle buttons, forms, and many other devices for displaying information and for inviting, accepting, and responding to user actions. In an embodiment, an icon includes a small picture or symbol of a graphical user interface that represents a program (or command), file, directory (also called a folder), device (such as a hard disk or floppy), or user options. In an embodiment, a widget represents an activatable user control. In an embodiment, a widget facilitates a specific user-computer interaction. In an embodiment, a widget and the delineated touch-selectable area are elements of a graphical user interface. FIG. 3 also illustrates an ultrasound-conducting layer 240 associated with or as a part of the display surface.

FIG. 4 illustrates ultrasound transmitters 251-255 of the system 200 acoustically coupled to the ultrasound-conducting layer 240 of the display surface 210. The system 200 includes an ultrasound transmitter, illustrated by the ultrasound transmitter 255, acoustically coupled to the ultrasound-conducting layer. The ultrasound transmitter is configured to deliver a down-modulated ultrasound wave 265 to a first delineated area 225 of at least two delineated areas 220 of the display surface. The delivered down-modulated ultrasound wave has a power density producing a stress pattern directly perceivable or discernible by a human appendage touching 280 the first delineated area. In an embodiment, the stress pattern is directly perceivable or discernible by the skin of the human appendage touching the first delineated area. FIG. 4 also illustrates ultrasound transmitters 251-254 similarly configured and acoustically coupled to the ultrasound-conducting layer of the display surface. In an embodiment, a delivered or transmitted ultrasound wave as used herein is not limited to a single cycle or single pulse. In an embodiment, an ultrasound wave has a duration, for example in the neighborhood of between 0.5 seconds and 2 seconds. In an embodiment, an ultrasound wave may include a repetition of a few cycles of ultrasound separated in time with gaps of no signal, such as for example, a pulsed ultrasound wave.

The system 200 includes a controller 270 configured to initiate a delivery of the down-modulated ultrasound wave 265 to the first delineated area 225 by the ultrasound transmitter in response to an indication of a detected touch 280 by the human appendage to at least a portion of the first delineated area 225.

In an embodiment, the display surface 210 includes a touch screen display surface. In an embodiment, the display surface includes a dynamic display surface. For example, a dynamic display surface may include a screen or monitor of computer, tablet, laptop, smart phone, or television. In an embodiment, a dynamic display surface may include a surface having a content projected onto it. In an embodiment, the display surface includes a static display surface. For example, a static display surface may include a static picture or graphic.

In an embodiment, the ultrasound wave includes a longitudinal wave or a shear wave. In an embodiment, the down-modulated ultrasound wave includes a down-modulated surface acoustic wave. In an embodiment, the human appendage includes a stylus held or gripped by the human appendage. In an embodiment, the human appendage includes a portion of a human hand. For example, a portion of the human hand may include a finger, thumb, palm, or heel of the human hand.

In an embodiment, the down-modulated ultrasound wave 265 includes a frequency-downshifted modulated ultrasound wave. In an embodiment, the frequency-downshifted modulated ultrasound wave includes at least one frequency component lower than a primary carrier frequency of the ultrasound wave. For example, U.S. Pub. Pat. App. 2011/0260988, Method and Apparatus for Increasing Magnitude and Frequency of Forces Applied to a Bare Finger on a Haptic Surface, J. E. Cogate, et al., describes the human fingertip as "sensitive to vibrations in a range of 20 Hz to about 500 Hz, with a peak in sensitivity at about 250 Hz." For example, a 20 kHz ultrasound carrier may be modulated at 1 kHz. For example, the modulated ultrasound wave may be frequency-downshifted by 75%. I.e., 20 kHz to 5 kHz. For example, the modulated ultrasound wave may be frequency-downshifted by 90%. I.e. 20 kHz to 2 kHz. In an embodiment, the down-modulated ultrasound wave includes a frequency-downshifted modulated ultrasound wave configured to produce a "chirp" modulation. In an embodiment, the frequency-downshifted modulated ultrasound wave includes at least two frequency components lower than a primary carrier frequency of the ultrasound wave. In an embodiment, the at least one frequency component is less than 1 kHz. In an embodiment, the at least one frequency component is less than 100 Hz. In an embodiment, the down-modulated ultrasound wave is configured to produce a selected tactile sensation in the human appendage. For example, a selected tactile sensation may include a varying pattern, such as a chirp or sharp sensation, or a softer pulsating sensation. In an embodiment, the down-modulated ultrasound wave includes an amplitude-modulated, a frequency modulated, or a single sideband down-modulated ultrasonic wave. In an embodiment, the down-modulated ultrasound wave includes an ultrasound wave having a modulation parameter selected in response to the particular part of the human appendage touching the display surface. For example, a particular part of the human appendage may include a thumb, finger, palm, or elbow.

In an embodiment, the down-modulated ultrasound wave includes an ultrasound wave having a modulation parameter selected in response to the particular action or context associated with the human appendage touching the display surface. For example, the user may employ the touch in order to select a displayed item, to drag an item, to copy an item, to change the size of an item, to drop an item, or the like; such actions may invoke different modulation parameters. For example, the effect of a user's touch may depend on context, e.g., the user may touch an item without first having dropped a previously selected one, may intend to select multiple items, may attempt to drop an item without previously selecting one, or the like; such contextual information may be conveyed via different modulation parameters. The selected modulation parameter may include an ultrasound power level or down-modulation frequency.

In an embodiment, the first delineated area substantially corresponds to the touch location 280 of the human appendage. In an embodiment, the power density of the ultrasound wave within the first delineated area is greater than that within a second delineated area. It is expected that the difference in power density will assist the human in discerning between the first delineated area and the second delineated area. In an embodiment, the power density of the ultrasound wave within the first delineated area is greater than that within a second delineated area by a factor of two, by a factor of five, or by a factor of ten.

In an embodiment, the ultrasound wave (longitudinal or shear) can be directed (steered and/or focused) by an array of transmitter elements; these may be located along part or all of the border of the display. The wave can be directed (steered and/or focused) by controlling the phase and/or amplitude of the waves emitted from each transmitter element of the array. In an embodiment, the ultrasound transmitter, illustrated by the ultrasound transmitter 255, includes a phased-array ultrasound transmitter, so as to control the phase of the waves. In an embodiment, the ultrasound transmitter includes an amplitude-patterned ultrasound transmitter so as to control the amplitude of the waves. In an embodiment, the ultrasound transmitter includes a holographic amplitude ultrasound transmitter so as to control the amplitude of the waves.

In an embodiment, the controller 270 includes a controller configured to (i) receive an indication of a detected touch 280 to at least a portion of the first delineated area 225, (ii) retrieve or select a down-modulation pattern from a lookup table 274 responsive to the indication of the detected touch, and (iii) initiate a delivery to the first delineated area of the down-modulated ultrasound wave 265 by the ultrasound transmitter 255, the ultrasound wave down-modulated in response to the retrieved or selected modulation pattern. In an embodiment, the controller 270 is further configured to select an aspect of the modulation pattern from a lookup table 274 responsive to the indication of the detected touch. For example, a selected aspect may include a particular frequency or pattern, i.e., a chirp, slowly fluctuating waveform. In an embodiment, the down-modulated ultrasound wave includes a down-modulated ultrasonic wave having a power density producing a haptic stimulation directly perceivable or discernible by a human appendage touching the first delineated area. In an embodiment, the down-modulated ultrasound wave includes a down-modulated ultrasonic wave having a power density producing a tactile haptic feedback directly perceivable or discernible by a human appendage touching the first delineated area.

In an embodiment, the system 200 includes a touch tracking device 272 configured to detect a touch 280 by the human appendage to at least a portion of the first delineated area, illustrated as delineated area 225. For example, the touch tracking device may be carried on-board a device that includes the display surface 210, or it may stand alone from the device that includes the display surface. For example, the touch tracking device may be a component of a touch-screen computing device, e.g., a resistive or capacitive sensor used to report the touch location to an operating system or application running on the touch-screen computing device. For example, the touch tracking device may include a camera or a probe. For example, the touch tracking device may include the position or motion tracking technology of the Wii Remote of the WHO by Nintendo of America, Redmond, Wash. For example, the touch tracking device may include the position or motion tracking technology of the Kinect® by Microsoft, Redmond, Wash. For example, the touch tracking device may include the position or motion tracking technology of the Leap Motion Controller by Leap Motion, Inc., San Francisco, Calif. In an embodiment, the ultrasound transceiver and the ultrasound transmitter share at least one component. In an embodiment, the touch tracking device includes at least one component of a touch sensitive display surface. For example, a single transceiver may perform both tracking and delivering the down-modulated wave.

In an embodiment, the touch tracking device 272 includes a touch sensitive display surface. In an embodiment, the touch tracking device is further configured to report a location of the detected touch. In an embodiment, the touch tracking device is further configured to report a firmness of the detected touch. In an embodiment, the touch tracking device is further configured to report a duration of the detected touch.

In an embodiment, an ultrasound transmitter includes a first ultrasound transmitter, illustrated as the ultrasound transmitter 255, and a second ultrasound transmitter, illustrated as the ultrasound transmitter 251. The first ultrasound transmitter is acoustically coupled to the ultrasound-conducting layer 240 of a display surface 210 and configured to deliver a first down-modulated ultrasound wave 265 to a first delineated area of at least two delineated areas of the display surface. The first delineated area is illustrated by delineated area 225 of the at least two delineated areas 221-225, and first down-modulated ultrasound wave is illustrated by down-modulated ultrasound wave 265. The first down-modulated ultrasound wave having a power density producing a first stress pattern directly perceivable or discernible by a human appendage touching 280 the first delineated area. The second ultrasound transmitter is acoustically coupled to the ultrasound-conducting layer of the display surface and configured to deliver a second down-modulated ultrasound wave to a second delineated area of the at least two delineated areas of the display surface. The second delineated area is illustrated by delineated area 251, and the second down-modulated ultrasound wave is illustrated by down-modulated ultrasound wave 261. The second down-modulated ultrasound wave has a power density producing a second stress pattern directly perceivable or discernible by a human appendage touching (not illustrated) the second delineated area. In this embodiment, the controller 270 includes a controller configured to (i) initiate a delivery of the first down-modulated ultrasound wave to the first delineated area by the first ultrasound transmitter in response to an indication of a first detected touch by the human appendage to at least a portion of the first delineated area, or (ii) initiate a delivery of the second down-modulated ultrasound wave to the second delineated area by the second ultrasound transmitter in response to an indication of a second detected touch by the human appendage to at least a portion of the second delineated area. In an embodiment, the first modulated ultrasound wave and the second modulated ultrasound wave have different carrier frequencies. In an embodiment, the first modulated ultrasound wave and the second modulated ultrasound wave have a substantially same carrier frequency. In an embodiment, the second stress pattern includes a difference from the first stress pattern that is a humanly perceivable or discernible difference. For example a frequency difference of approximately 100 Hz, or approximately 200 Hz is expected to produce a humanly perceivable or discernible difference. In an embodiment, the first stress pattern produces a first directly perceivable or discernible effect on the human appendage and the second stress pattern produces a second and different directly perceivable or discernible effect on the human appendage. For example, the first wave may be modulated at 1000 kHz and the second wave modulated at 1200 kHz or some other frequency where a difference is readily perceivable by the average human appendage.

In the embodiment, the ultrasound transmitter further includes a third ultrasound transmitter, illustrated by the ultrasound transmitter 253. The third ultrasound transmitter is acoustically coupled to the ultrasound-conducting layer 240 of the display surface 210 and configured to deliver a third down-modulated ultrasound wave to a third delineated area of the display surface, illustrated as delivering the down-modulated ultrasound wave 263 to a third delineated area 223 of the display surface. The third down-modulated ultrasound wave has a power density producing a stress pattern directly perceivable or discernible by the human appendage touching the third delineated area. In this embodiment, the controller 270 is further configured to (i) initiate a delivery of the first down-modulated ultrasound wave to the first delineated area by the first ultrasound transmitter in response to an indication of a first detected touch by the human appendage to at least a portion of the first delineated area; (ii) initiate a delivery of the second down-modulated ultrasound wave to the second delineated area by the second ultrasound transmitter in response to an indication of a second detected touch by the human appendage to at least a portion of the second delineated area; or (iii) initiate a delivery of the third down-modulated ultrasound wave to the third delineated area by the third ultrasound transmitter in response to an indication of a third detected touch by the human appendage to at least a portion of the third delineated area. In this embodiment, the first stress pattern produces a first directly perceivable or discernible effect on the human appendage, the second stress pattern produces a second and different directly perceivable or discernible effect on the human appendage, and the third stress pattern produces a third and further different directly perceivable or discernible effect on the human appendage. FIG. 4 further illustrates ultrasound transmitter 252 configured to deliver down-modulated ultrasound wave 262, and ultrasound transmitter 254 configured to deliver down-modulated ultrasound wave 264.

Figure 5:
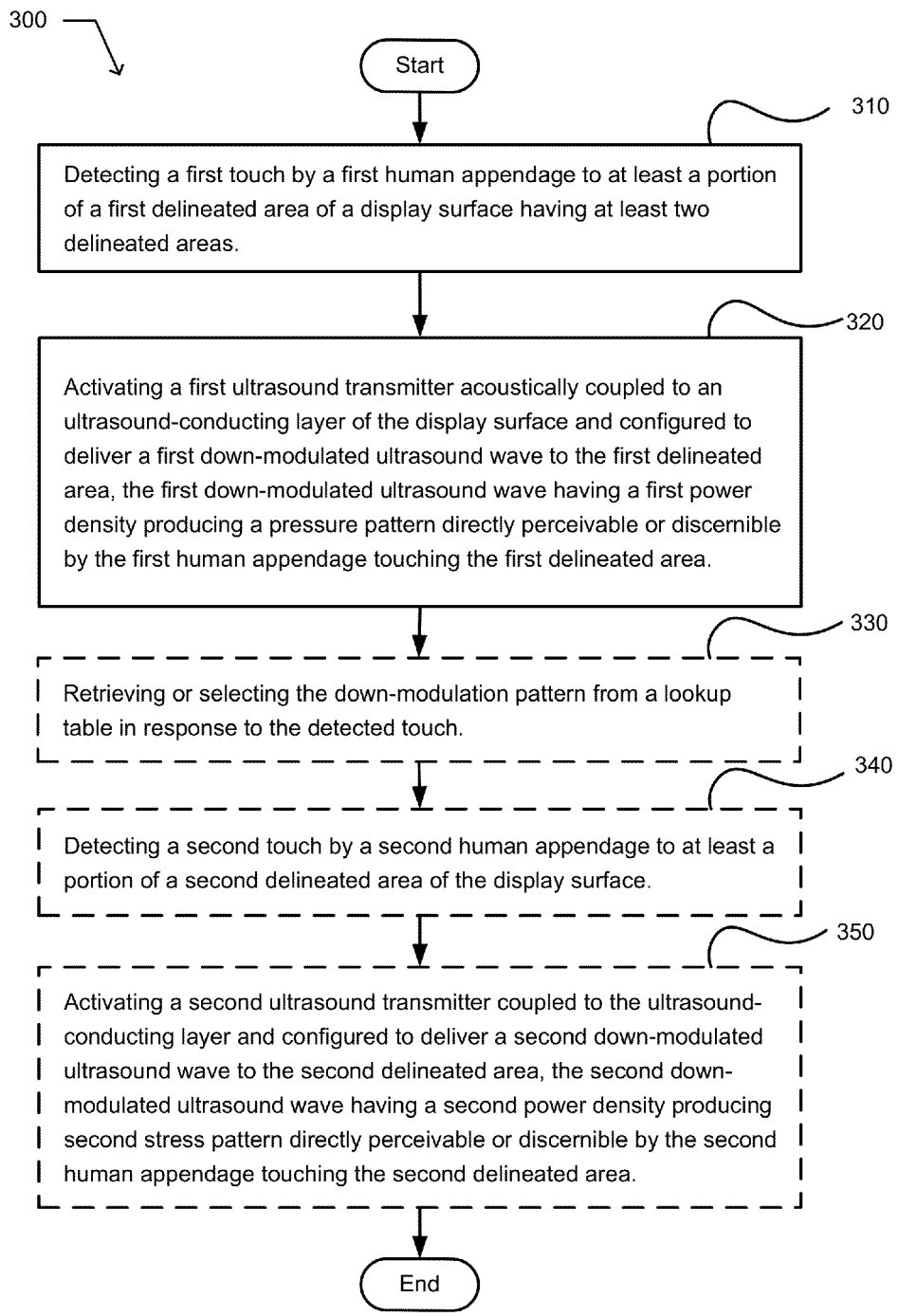
FIG. 5 illustrates an example operational flow 300.

FIG. 5 illustrates an example operational flow 300. After a start operation, the operational flow includes a first sensing operation 310. The first sensing operation includes detecting a first touch by a first human appendage to at least a portion of a first delineated area of a display surface having at least two delineated areas. In an embodiment, the first sensing operation may be implemented using the touch tracking device 272 described in conjunction with FIG. 4. A first tactile feedback operation 320 includes activating a first ultrasound transmitter acoustically coupled to an ultrasound-conducting layer of the display surface and configured to deliver a first down-modulated ultrasound wave to the first delineated area. The first down-modulated ultrasound wave has a first power density producing a stress pattern directly perceivable or discernible by the first human appendage touching the first delineated area. In an embodiment, the first tactile feedback operation may be implemented using the ultrasound transmitter 255 described in conjunction with FIG. 4. The operational flow includes an end operation.

In an embodiment, the operational flow 300 includes an operation 330 retrieving or selecting the down-modulation pattern from a lookup table in response to the detected touch. In an embodiment, the retrieving or selecting is responsive to a location, strength, duration, or motion aspect of the detected touch. In an embodiment, the operation 330 may be implemented using the lookup table 274 described in conjunction with FIG. 4. In an embodiment, the operational flow includes a second sensing operation 340. The second sensing operation includes detecting a second touch by the human appendage to at least a portion of a second delineated area of the display surface. In this embodiment, the operational flow includes a second tactile feedback operation 350. The second tactile feedback operation includes activating a second ultrasound transmitter coupled to the ultrasound-conducting layer and configured to deliver a second down-modulated ultrasound wave to the second delineated area. The second down-modulated ultrasound wave having a second power density producing second stress pattern directly perceivable or discernible by the human appendage touching the second delineated area. In an embodiment, the first down-modulated ultrasound wave and the second down-modulated ultrasound wave are delivered simultaneously or sequentially. For example, a perception of a simultaneous delivery may be accomplished by an interleaved delivery of the first down-modulated ultrasound wave and the second down-modulated ultrasound wave, i.e., 5 milliseconds to first delineated area, 5 milliseconds to the second delineated area, 5 milliseconds to first delineated area, and so on. For example, a perception of a sequential delivery may be accomplished by an alternating delivery of the first down-modulated ultrasound wave and the second down-modulated ultrasound wave, i.e., 1 second to first delineated area, 1 second to the second delineated area, 1 second to first delineated area, and so on. In an embodiment, the first and second appendage can be different portions (i.e., different fingers) of an appendage.

Figure 6:
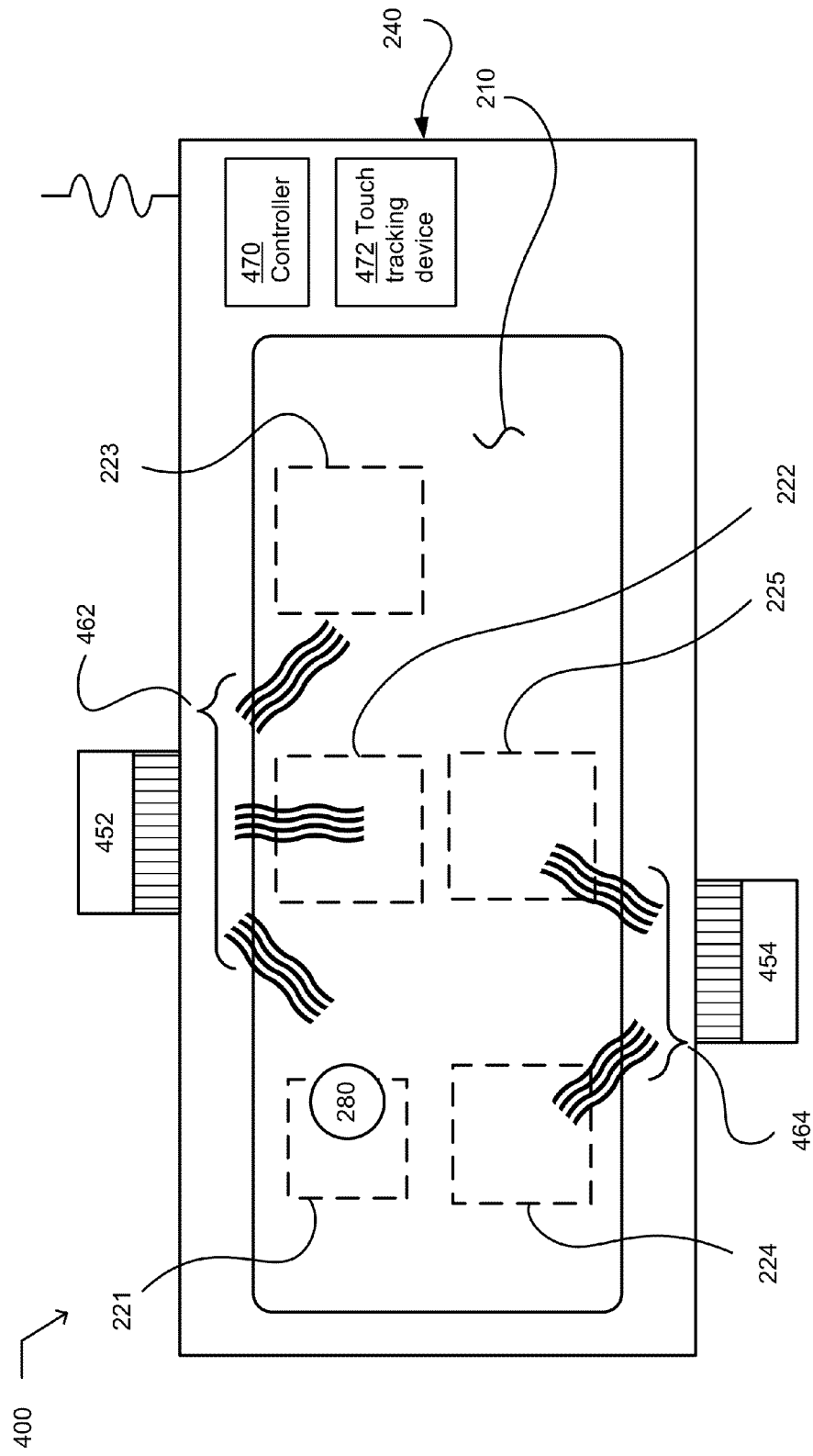
FIG. 6 illustrates an example system 400.

FIG. 6 illustrates an example system 400. The system includes a steered-beam ultrasound transmitter, illustrated by a steered-beam ultrasound transmitter 452. The steered-beam ultrasound transmitter is acoustically coupled to the ultrasound-conducting layer 240 of the display surface 210, and is configured to deliver a down-modulated ultrasound wave, illustrated by down-modulated ultrasound wave 462, to a delineated area selected from the at least two delineated areas 221-225 of the display surface. The down-modulated ultrasound wave has a power density producing a stress pattern directly perceivable or discernible by a human appendage touching 280 the selected delineated area, which is illustrated by delineated area 221. The system includes a controller 470 configured to select a delineated area from the at least two delineated areas in response to a location of a detected touch by the human appendage to the display surface. The controller is further configured to initiate a delivery of the down-modulated ultrasound wave to the selected delineated area by the steered-beam ultrasound transmitter.

In an embodiment, the steered-beam ultrasound transmitter, illustrated by the steered-beam ultrasound transmitter 452, includes a steered-beam ultrasound transducer. In an embodiment, the steered-beam ultrasound transmitter includes a steered-beam ultrasound transmitter array. For example, the steered-beam ultrasound transmitter array may be electronically focused. In an embodiment, the steered-beam ultrasound transmitter includes a steered-beam, phased-array ultrasound transmitter. In an embodiment, the steered-beam ultrasound transmitter includes at least one of a linear, semi-circular, or annular sector phased-array ultrasound transmitter. In an embodiment, the steered-beam ultrasound transmitter includes a steered-beam, amplitude-patterned ultrasound transmitter.

In an embodiment, the steered-beam ultrasound transmitter includes a first steered-beam ultrasound transmitter and a second steered-beam ultrasound transmitter. For example, the first steered-beam ultrasound transmitter may be illustrated by the steered-beam ultrasound transmitter 452 and the second steered-beam ultrasound transmitter may be illustrated by the steered-beam ultrasound transmitter 454. A linear interaction of the down-modulated ultrasound wave 462 delivered by the steered-beam ultrasound transmitter 452 and the down-modulated ultrasound wave 464 delivered by the steered-beam ultrasound transmitter 454 to the selected delineated area producing a linear interaction at the selected delineated area. In an embodiment, a direction of a first plane along a line of the transducer elements of the first steered-beam ultrasound transmitter is non-collinear with respect to a direction of a second plane along a line of the transducer elements of the second steered-beam ultrasound transmitter. In an embodiment, the first steered-beam ultrasound transmitter and a second steered-beam ultrasound transmitter are physically spaced-apart. In an embodiment, the steered-beam ultrasound transmitter includes a steered-beam ultrasound transmitter configured to deliver a phase-conjugated down-modulated ultrasound wave to a selected delineated area of the at least two delineated areas. In an embodiment, the steered-beam ultrasound transmitter includes a steered-beam ultrasound transmitter configured to deliver a focused, phase-conjugated down-modulated ultrasound wave to a selected delineated area of the at least two delineated areas.

In an embodiment, the controller 470 is configured to select a delineated area from the at least two delineated areas 221-225 in response to an indication of a location of a detected touch 280 by the human appendage to the display surface 210. In an embodiment, the controller is configured to select a delineated area from the at least two delineated areas nearest to a location of a detected touch by the human appendage to the display surface.

In an embodiment, the steered-beam ultrasound transmitter, illustrated as the steered beam ultrasound transmitter 452, includes a phased-array ultrasound transmitter configured to deliver a first ultrasound wave having a first modulation to a first selected delineated area of the at least two delineated areas 221-225, and configured to deliver a second ultrasound wave having a second modulation to a second selected delineated area of the at least two delineated areas. In an embodiment, the phased-array ultrasound transmitter is configured to simultaneously or sequentially deliver the first down-modulated ultrasound wave and the second down-modulated ultrasound wave. For example, interlaced transducer elements may be used to deliver the first and second ultrasound waves. For example, a first portion of transducer elements may be used to deliver the first ultrasound wave and a second portion of transducer elements may be used to deliver the second ultrasound wave. In an embodiment, the delivery of the first down-modulated ultrasound wave and the delivery of the second down-modulated ultrasound wave are coordinated to appear simultaneous to the human appendages. In an embodiment, the delivery of the first down-modulated ultrasound wave and the delivery of the second down-modulated ultrasound wave are coordinated to appear sequential to the human appendages. For example, the delivery may be considered as analogous to visual input within the eye's flicker response time. In an embodiment, the controller 470 is configured to (i) select a first delineated area from the at least two delineated areas in response to an indication of a location of a first detected touch by the human appendage to the display surface and to initiate a delivery by the phased-array ultrasound transmitter of the first down-modulated ultrasound wave to the selected first delineated area, or (ii) select a second delineated area from the at least two delineated areas in response to an indication of a location of a second detected touch by the human appendage to the display surface and to initiate a delivery by the phased-array ultrasound transmitter of the second down-modulated ultrasound wave to the selected second delineated area.

In an embodiment, the system 400 includes a touch tracking device 472 configured to detect a touch 280 by the human appendage to at least a portion of the first delineated area or to at least a portion of the second delineated area.

Figure 7:
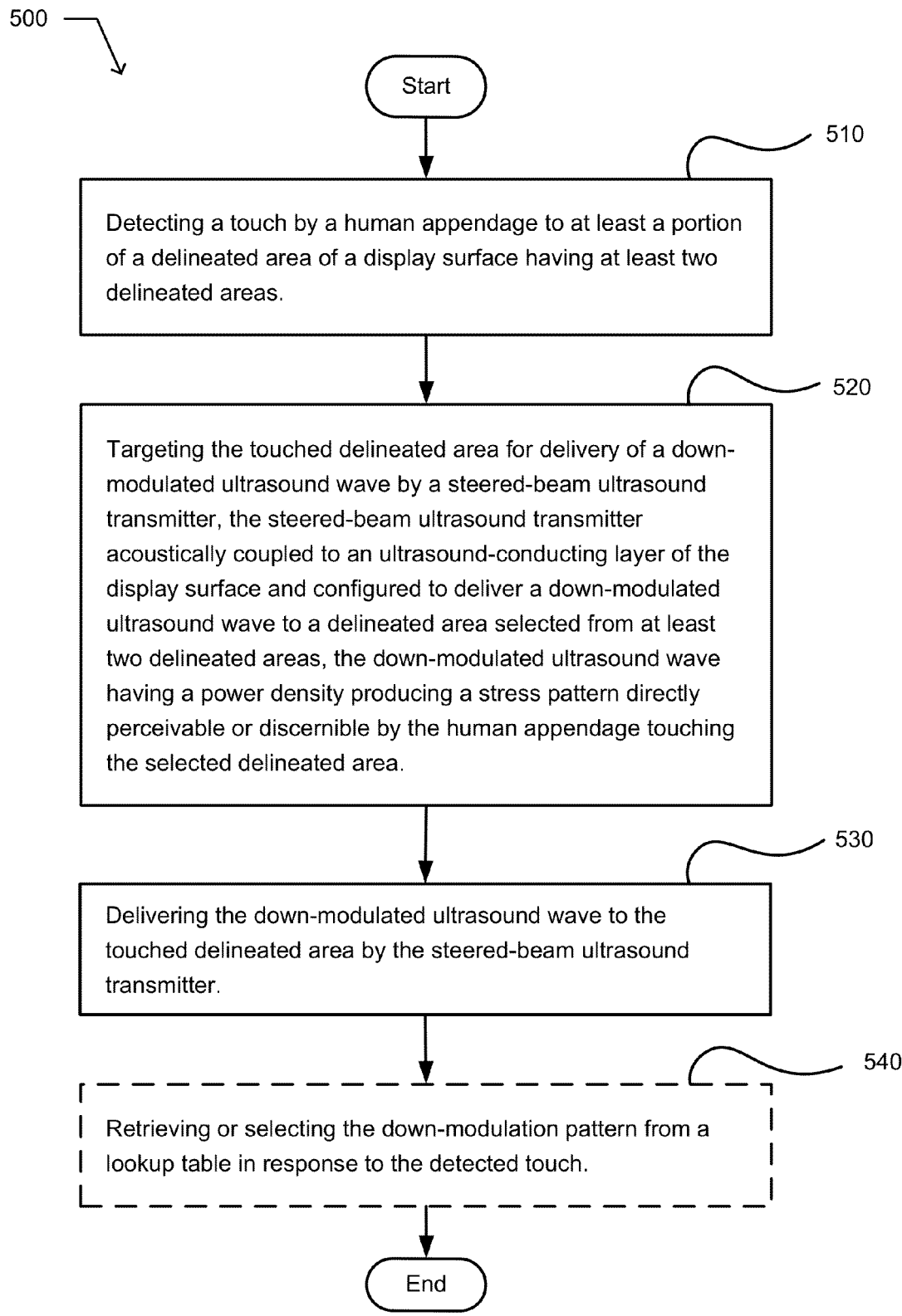
FIG. 7 illustrates an example operational flow 500.

FIG. 7 illustrates an example operational flow 500. After a start operation, the operational flow includes a sensing operation 510. The sensing operation includes detecting a touch by a human appendage to at least a portion of a delineated area of a display surface having at least two delineated areas. In an embodiment, the sensing operation may be implemented using the touch tracking device 472 described in conjunction with FIG. 6. A steering operation 520 includes targeting the touched delineated area for delivery of a down-modulated ultrasound wave by a steered-beam ultrasound transmitter. The steered-beam ultrasound transmitter is acoustically coupled to an ultrasound-conducting layer of the display surface and configured to deliver a down-modulated ultrasound wave to a delineated area selected from at least two delineated areas. The down-modulated ultrasound wave having a power density producing a stress pattern directly perceivable or discernible by the human appendage touching the selected delineated area. In an embodiment, the steering operation may be implemented by the controller 470 configuring the steered-beam ultrasound transmitter 452 to target the touched delineated area as described in conjunction with FIG. 6. A tactile feedback operation 530 includes delivering the down-modulated ultrasound wave to the touched delineated area by the steered-beam ultrasound transmitter. In an embodiment, the tactile feedback operation may be implemented by the steered-beam ultrasound transmitter 452 as described in conjunction with FIG. 6. The operational flow includes an end operation. In an embodiment, the operational flow includes an operation 540 retrieving or selecting the down-modulation pattern from a lookup table in response to the detected touch.

Figure 8:
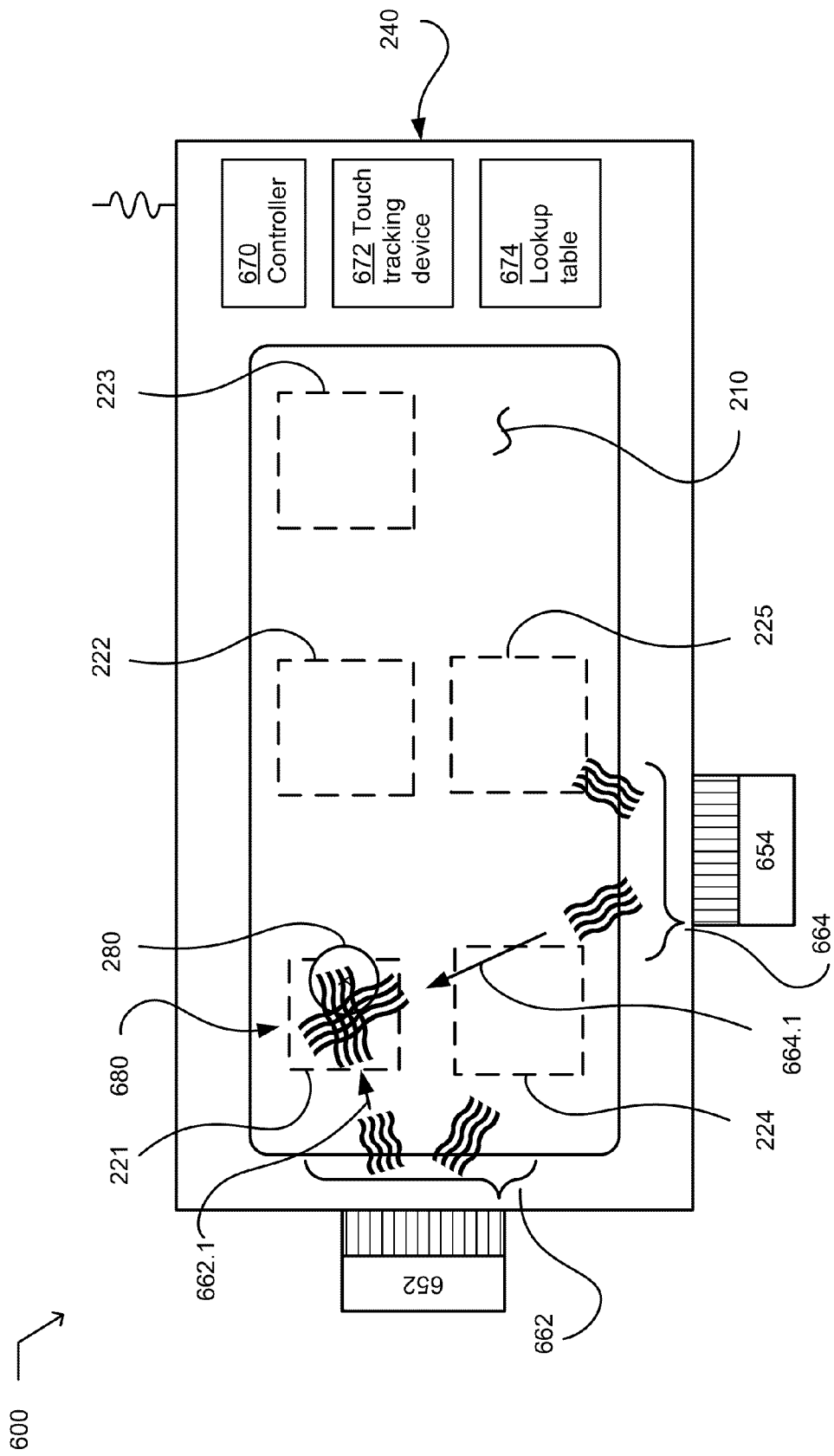
FIG. 8 illustrates an example system 600.

FIG. 8 illustrates an example system 600. The system includes a first ultrasound transmitter 652 acoustically coupled to the ultrasound-conducting layer 240 of the display surface 210. The first ultrasound transmitter is configured to deliver a first ultrasound wave 662 to a delineated area selected from the at least two delineated areas 221-225 of the display surface. The first ultrasonic wave has a first carrier frequency and amplitude sufficient to induce a non-linear vibrational response of the ultrasound-conducting layer. The system includes a second ultrasound transmitter 654 acoustically coupled to the ultrasound-conducting layer. The second ultrasound transmitted is configured to deliver a second ultrasound wave 664 to the selected delineated area. The second ultrasonic wave has a second carrier frequency and amplitude sufficient to induce a non-linear vibrational response of the ultrasound-conducting layer. The system includes a controller 670 configured to select a delineated area from the at least two delineated areas in response to an indication of a location of a detected touch 280 by a human appendage to the display surface. The controller is also configured to initiate a delivery of the first ultrasonic wave by the first ultrasound transmitter and a delivery of the second ultrasonic wave by the second ultrasound transmitter, both to the selected delineated area. FIG. 8 illustrates an example where the selected delineated area is the delineated area 221. Also illustrated are the first ultrasonic wave propagating 662.1 toward the selected delineated area, and the second ultrasonic wave propagating 664.1 toward the selected delineated area. The parameters of the first carrier frequency and amplitude and second carrier frequency and amplitude are such that a non-linear interaction 680 of the first ultrasound wave and the second ultrasound wave at the selected delineated area 221 produces a stress pattern directly perceivable or discernible by the human appendage.

In an embodiment, a delineated area includes a delineated selectable area, or a region or area displayed by or projected on a two-dimensional display surface 210. In an embodiment, the ultrasound wave includes a longitudinal or a shear wave. In an embodiment, the first ultrasonic wave includes a first surface acoustic wave. In an embodiment, the second ultrasonic wave includes a second surface acoustic wave. In an embodiment, the first ultrasonic wave propagates 662.1 toward the selected delineated area in a first direction, and the second ultrasonic wave propagates 664.1 toward the selected delineated area in a second direction that is non-collinear with respect to the first direction. In an embodiment, the second direction is orthogonal with respect to the first direction. In an embodiment, a direction of a first plane along a line of the transducer elements of the first steered-beam ultrasound transmitter 652 is orthogonal with respect to a direction of a second plane along the line of the transducer elements of the second steered-beam ultrasound transmitter 654.

In an embodiment, the non-linear interaction 680 of the first ultrasound wave 664 and the second ultrasound wave 665 at the selected delineated area 221 produces a stress pattern having a frequency-downshifted component. The nonlinear combination of two waves having different frequencies so as to produce a frequency-downshifted component is well known to those of ordinary skill in the art, and is described (for air) by P. J. Westervelt, *Parametric acoustic array*, J. Acoust. Soc. Am. 35, 535-537 (1963). In an embodiment, the non-linear interaction of the first ultrasound wave and the second ultrasound wave at the particular delineated area produces a stress pattern having a frequency component between approximately 10 Hz and 1000 Hz. In an embodiment, the non-linear interaction of the first ultrasound wave and the second ultrasound wave at the particular delineated area produces a stress pattern having a frequency component between approximately 32 Hz and 8400 Hz. In an embodiment, the produced stress pattern includes a frequency component between approximately 65 Hz and 4190 Hz. In an embodiment, the produced stress pattern includes a frequency component between approximately 130 Hz and 2100 Hz. In an embodiment, the produced stress pattern includes a frequency component between approximately 260 Hz and 1500 Hz. In an embodiment, the produced stress pattern includes a frequency component between approximately 520 Hz and 1050 Hz. In an embodiment, the non-linear interaction of the first ultrasound wave and the second ultrasound wave at the selected delineated area produces a stress pattern having a frequency-downshifted component. For example, the stress pattern having a frequency-downshifted component may be produced by an addition or subtraction of the amplitudes of the first carrier frequency or the second carrier frequency. In an embodiment, the parameters of the first carrier frequency, amplitude, and pulse duration, and second carrier frequency amplitude, and pulse duration, are such that a non-linear interaction of the first ultrasound wave and the second ultrasound wave at the selected delineated area produces a stress pattern directly perceivable or discernible by the human appendage. In an embodiment, the stress pattern is tactilely perceivable or discernible by the human appendage. In an embodiment, the stress pattern produces a haptic stimulation directly perceivable or discernible by a human appendage touching the first delineated area. In an embodiment, the stress pattern produces a tactile haptic feedback directly perceivable or discernible by a human appendage touching the first delineated area. In an embodiment, the non-linear interaction includes a non-linear superposition.

In an embodiment, the controller 670 is configured to (i) receive an indication of a location of a detected touch 280 by a human appendage to the display surface 210, (ii) retrieve or select a stress pattern from a lookup table 674 responsive to the indication of the location of the detected touch, (iii) in response to the retrieved or selected stress pattern, specify the first carrier frequency and amplitude, and second carrier frequency and amplitude; and (iv) initiate a delivery of the specified first ultrasonic wave 662 by the first ultrasound transmitter 652 and a delivery of the second specified ultrasonic wave 664 by the second ultrasound transmitter 654 to the selected delineated area.

In an embodiment, the system includes a touch tracking device 672 configured to determine a location of a touch 280 by the human appendage to the display surface 210. In an embodiment, the touch tracking device is configured to determine a location of a touch by the human appendage relative to a delineated area of the display surface. In an embodiment, the touch tracking device is further configured to report a location of the detected touch. In an embodiment, the touch tracking device is further configured to report a firmness of the detected touch. In an embodiment, the touch tracking device is further configured to report a duration of the detected touch.

In an embodiment, the system 600 includes a third ultrasound transmitter (not illustrated) acoustically coupled to the ultrasound-conducting layer 240. The third ultrasound transmitter is configured to deliver a third ultrasound wave to another delineated area selected from the at least two delineated areas 221-225. The third ultrasonic wave has a third carrier frequency and amplitude sufficient to induce a non-linear vibrational response of the ultrasound-conducting layer. The parameters of the first carrier frequency and amplitude, and third carrier frequency and amplitude, are such that a non-linear interaction of the first ultrasound wave and the third ultrasound wave at the another selected delineated area produces another stress pattern directly perceivable or discernible by another human appendage. In an embodiment, the controller 670 is further configured to select the another delineated area from the at least two delineated areas in response to another indication of a location of another detected touch by another human appendage to the display surface. For example, the human appendage may include a right index finger and the another human appendage may include a left index finger. The controller is also configured to initiate a delivery of the first ultrasonic wave by the first ultrasound transmitter and a delivery of the third ultrasonic wave by the third ultrasound transmitter to the another selected delineated area. In an embodiment, the delivery of the first ultrasound wave 662 and the second ultrasound wave 664 to the selected delineated area 221, and the delivery of the first ultrasound wave and the third ultrasound wave to the another delineated area are coordinated by the controller to appear sequential.

In an embodiment of the system 600, the first ultrasound transmitter includes a first steered-beam ultrasound transmitter. In an embodiment, the first ultrasound transmitter includes a first steered-beam ultrasound transmitter and the second ultrasound transmitter includes a second steered-beam ultrasound transmitter. In an embodiment, the first steered-beam ultrasound transmitter and the second steered-beam ultrasound transmitter are not co-aligned. In an embodiment, the first steered-beam ultrasound transmitter is configured to deliver a first phase-conjugated ultrasound wave. In an embodiment, the first ultrasound transmitter includes a steered-beam, phased-array ultrasound transmitter. In an embodiment, the first steered-beam ultrasound transmitter includes at least one of a linear, semi-circular, or annular sector steered-beam ultrasound transmitter. In an embodiment, the first steered-beam ultrasound transmitter includes a first steered-beam ultrasound transmitter configured to deliver a first focused, phase-conjugated ultrasound wave to the selected delineated area. In an embodiment, the second ultrasound transmitter is physically spaced-apart from the first ultrasound transmitter. In an embodiment, the first ultrasound transmitter includes a first steered-beam, amplitude-patterned ultrasound transmitter.

Figure 9:
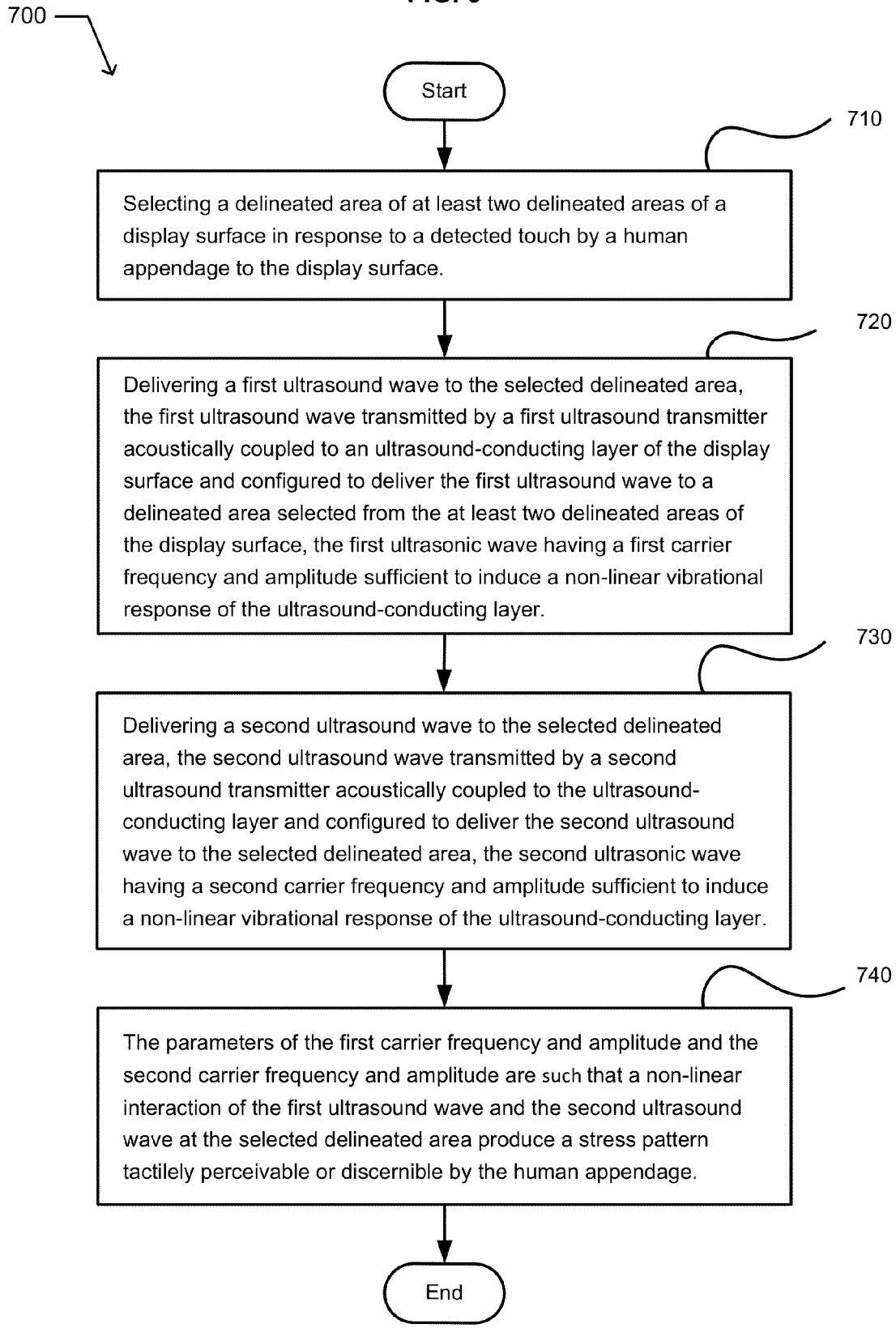
FIG. 9 illustrates an example operational flow 700.

FIG. 9 illustrates an example operational flow 700. After a start operation, the operational flow includes choosing operation 710. The choosing operation includes selecting a delineated area of at least two delineated areas of a display surface in response to a detected touch by a human appendage to the display surface. In an embodiment, the choosing operation may be implemented using the controller 670 described in conjunction with FIG. 8. A first broadcast operation 720 includes delivering a first ultrasound wave to the selected delineated area. The first ultrasound wave is transmitted by a first ultrasound transmitter acoustically coupled to an ultrasound-conducting layer of the display surface and configured to deliver the first ultrasound wave to a delineated area selected from the at least two delineated areas of the display surface. The first ultrasonic wave has a first carrier frequency and amplitude sufficient to induce a non-linear vibrational response of the ultrasound-conducting layer. In an embodiment, the first broadcast operation may be implemented using the first ultrasound transmitter 652 described in conjunction with FIG. 8. A second broadcast operation 730 includes delivering a second ultrasound wave to the selected delineated area. The second ultrasound wave is transmitted by a second ultrasound transmitter acoustically coupled to the ultrasound-conducting layer and configured to deliver the second ultrasound wave to the selected delineated area. The second ultrasonic wave has a second carrier frequency and amplitude sufficient to induce a non-linear vibrational response of the ultrasound-conducting layer. In an embodiment, the second broadcast operation may be implemented using the second ultrasound transmitter 654 described in conjunction with FIG. 8. At operation 740, the parameters of the first carrier frequency and amplitude and the second carrier frequency and amplitude are such that a non-linear interaction of the first ultrasound wave and the second ultrasound wave at the selected delineated area produce a stress pattern tactilely perceivable or discernible by the human appendage. In an embodiment, the selected first carrier frequency and amplitude and the selected second carrier frequency and amplitude are respectively preprogramed into the first ultrasound transmitter and the second ultrasound transmitter. In an embodiment, the controller 670 described in conjunction with FIG. 8 selects the first carrier frequency and amplitude and the selected second carrier frequency and amplitude. For example, the selection may be in response to the particular human appendage, such as a finger, two fingers, etc. For example, the selection may be in response to a position or location of the selected delineated area on the display surface. For example, the selection may be in response to a dimension or dimensions of the selected delineated area. The operational flow includes an end operation. In an embodiment, the operational flow 700 includes detecting the location of the touch by the human appendage to at least a portion of a delineated area of a display surface having at least two delineated areas.

Figure 10:
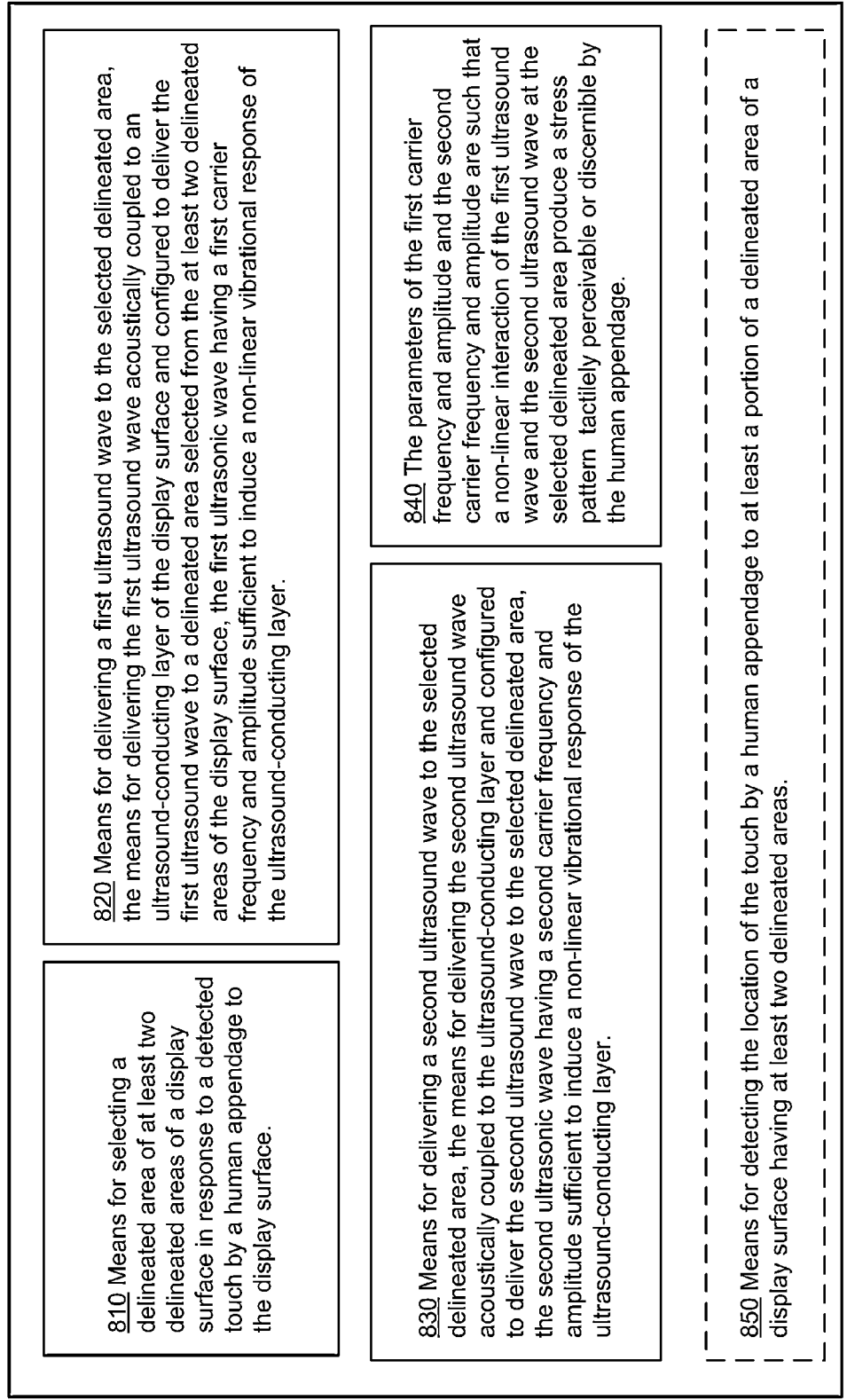
FIG. 10 illustrates an example system 800.

FIG. 10 illustrates an example system 800. The system includes means 810 for selecting a delineated area of at least two delineated areas of a display surface in response to a detected touch by a human appendage to the display surface. The system includes means 820 for delivering a first ultrasound wave to the selected delineated area. The means for delivering the first ultrasound wave is acoustically coupled to an ultrasound-conducting layer of the display surface and configured to deliver the first ultrasound wave to a delineated area selected from the at least two delineated areas of the display surface. The first ultrasonic wave has a first carrier frequency and amplitude sufficient to induce a non-linear vibrational response of the ultrasound-conducting layer. The system includes means 830 for delivering a second ultrasound wave to the selected delineated area. The means for delivering the second ultrasound wave is acoustically coupled to the ultrasound-conducting layer and configured to deliver the second ultrasound wave to the selected delineated area. The second ultrasonic wave has a second carrier frequency and amplitude sufficient to induce a non-linear vibrational response of the ultrasound-conducting layer. In the system, the parameters of the first carrier frequency and amplitude and the second carrier frequency and amplitude 840 are such that a non-linear interaction of the first ultrasound wave and the second ultrasound wave at the selected delineated area produce a stress pattern tactilely perceivable or discernible by the human appendage. In an alternative embodiment, the system includes means 850 for detecting the location of the touch by the human appendage to at least a portion of a delineated area of a display surface having at least two delineated areas.

Figure 11:
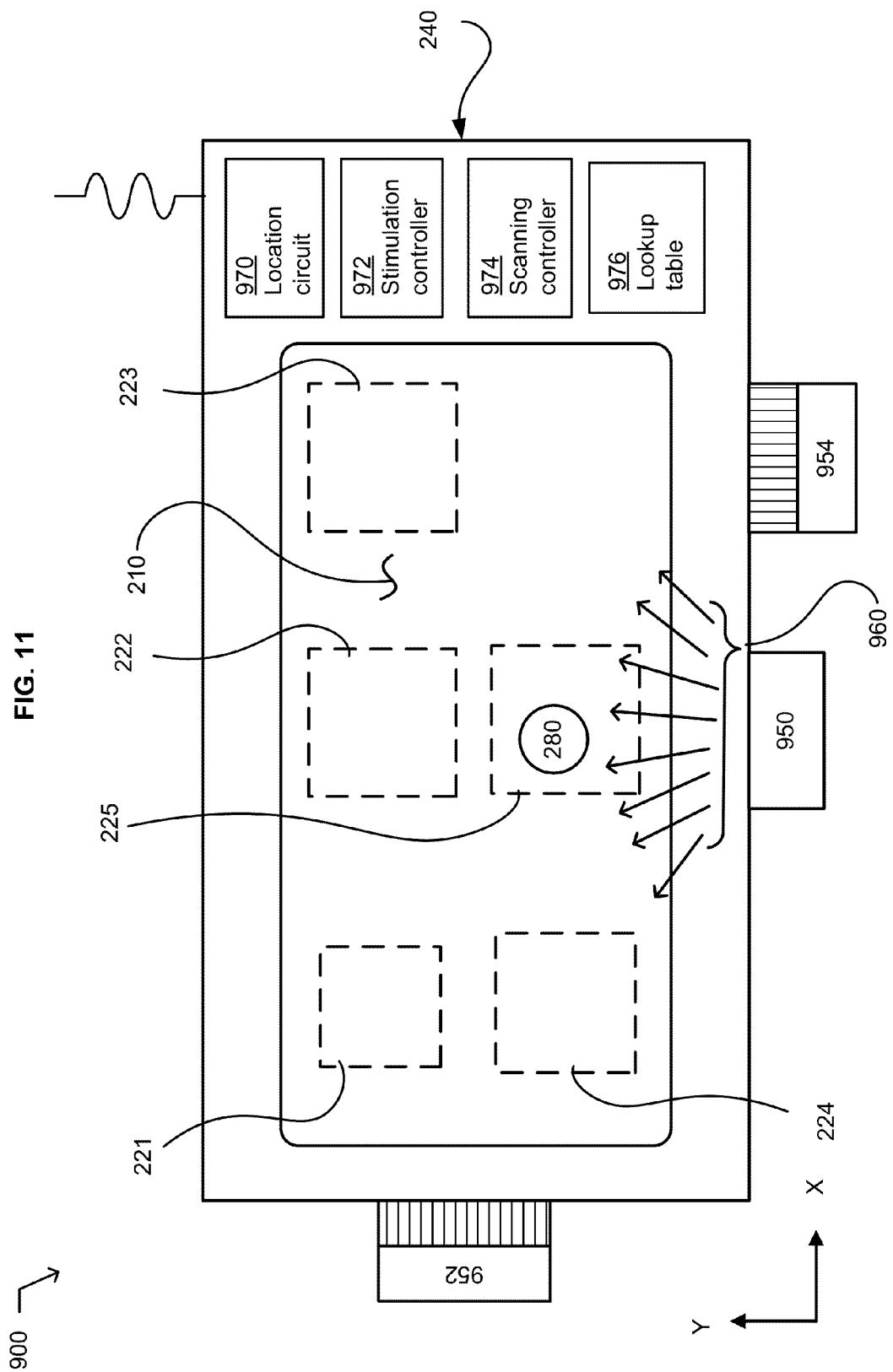
FIGS. 11-13 illustrate an example system 900.
Figure 12:
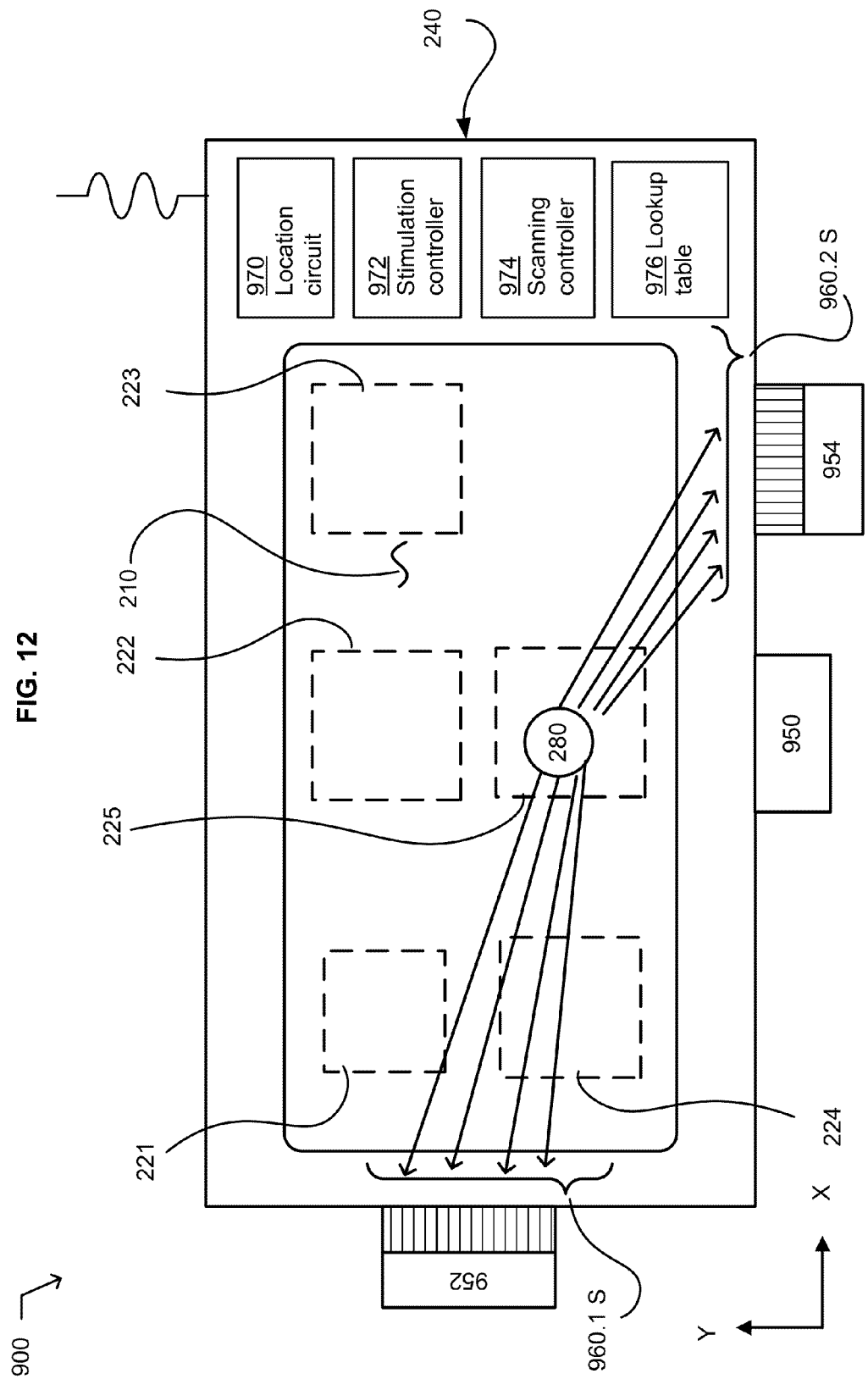
Figure 13:
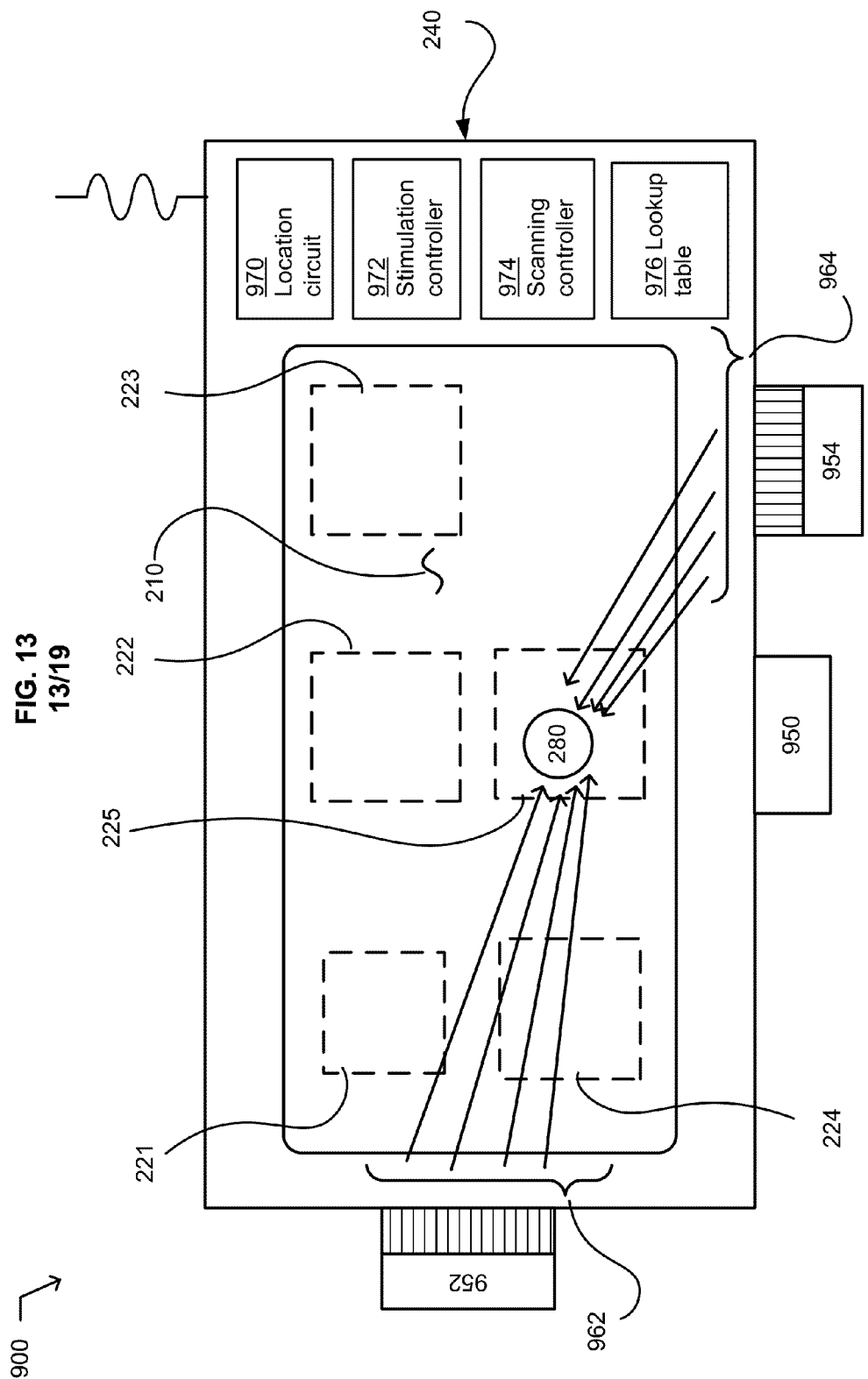

FIGS. 11-13 illustrate an example system 900. The system includes an ultrasound locator transmitter 950 acoustically coupled with the ultrasound-conducting layer 240 of the display surface 210. The ultrasound transmitter is configured to broadcast a detection ultrasound wave 960 across at least a portion the ultrasound-conducting layer. FIG. 11 illustrates the ultrasound transmitter 950 broadcasting the detection ultrasound wave 960 across at least a portion the ultrasound-conducting layer. The system includes a steered-beam ultrasound transducer 952 acoustically coupled with the ultrasound-conducting layer of the display surface. The steered-beam ultrasound transducer is configured to receive a portion 960.1S of the detection ultrasound wave scattered from a touch 280 by the human appendage to a location on the display surface. The touch location is illustrated as within the delineated area 225 of the at least two delineated areas 221-225. FIG. 12 illustrates the steered-beam ultrasound transducer receiving the portion 960.1S of the detection ultrasound wave scattered from the touch to a location on the display surface. In an alternative embodiment, the display surface does not include any delineated areas. The steered-beam ultrasound transducer 952 is configured to deliver a focused ultrasound wave to the touch location. The focused ultrasound wave has a power density producing a stress pattern directly perceivable or discernible by the human appendage at the touch location. FIG. 13 illustrates the steered-beam ultrasound transducer delivering the focused ultrasound wave 962 to the touch location. The system includes a stimulation controller 972 configured to initiate a delivery of the focused ultrasound wave to the touch location by the steered-beam ultrasound transducer.

In an embodiment, the ultrasound locator transmitter 950 includes a phased-array ultrasound transducer configured to broadcast a detection ultrasound wave 960 across the at least two possible locations of a touch to the display surface by a human appendage. In an embodiment, the detection ultrasound wave includes a pulsed detection ultrasound wave. In an embodiment, the ultrasound locator transmitter is configured to broadcast a detection ultrasound wave across at least two possible locations of a touch by a human appendage to the display surface. In an embodiment, the ultrasound locator transmitter includes a phased-array ultrasound locator transmitter configured to broadcast a detection ultrasound wave across the at least two possible locations of a touch to the display surface by a human appendage. In an embodiment, the ultrasound locator transmitter includes an amplitude-patterned ultrasound transmitter configured to broadcast a detection ultrasound wave across the at least two possible locations of a touch to the display surface by a human appendage.

In an embodiment, the steered-beam ultrasound transducer 952 and the ultrasound locator transmitter 950 share at least one component. In an embodiment, the steered-beam ultrasound transducer is configured to deliver a focused, down-modulated ultrasound wave. In an embodiment, the focused ultrasound wave includes a focused surface acoustic wave.

In an embodiment, the stimulation controller 972 is configured to retrieve a down-modulation pattern from a lookup table 976. The controller is configured to initiate a delivery of the focused ultrasound wave 962 down-modulated in response to the retrieved modulation pattern to the determined touch location by the steered-beam ultrasound transducer. In an embodiment, the down-modulation pattern is retrieved from the lookup table in response to determined location of the touch or an attribute of the human appendage. In an embodiment, the steered-beam ultrasound transducer includes a phased-array ultrasound transducer. In an embodiment, the steered-beam ultrasound transmitter includes a steered-beam, amplitude-patterned ultrasound transmitter. In the embodiment, the stimulation controller is configured to initiate a delivery of a focused, phase-conjugated down-modulated ultrasound wave to the touch location by the steered-beam ultrasound transducer. The delivery is initiated in response to the reception of the portion 960.1S of the scattered detection ultrasound wave 960. For example, the steered-beam ultrasound transducer may be considered to have inverted or phase-conjugated the received wave 960.1S at each element of the phased array.

In an embodiment, the system 900 includes a location circuit 970 configured to determine the touch 280 location in response the received portion 960.1S of the scattered detection ultrasound wave 960. In an embodiment, the location circuit is configured to determine the touch location relative to the steered-beam ultrasound transducer 952. In an embodiment, the stimulation controller is configured to initiate a delivery of the focused ultrasound wave 962 to the determined touch location by the steered-beam ultrasound transducer. In an embodiment, the display surface includes at least two delineated areas 221-225. In this embodiment, the location circuit is configured to select a delineated area of the at least two delineated areas in response to the determined touch location. In this embodiment, the controller is configured to initiate a delivery of the focused ultrasound wave to the selected delineated area.

In an embodiment, the system 900 includes a scanning controller 974 configured to initiate the broadcast of the detection ultrasound wave 960 by the ultrasound locater transmitter 950. In an embodiment, the scanning controller is configured to initiate the broadcast of the detection ultrasound wave in response to a schedule, a timer, or a sensed movement of the human appendage proximate to the display surface 210.

In an embodiment, the steered-beam ultrasound transmitter 952 is further configured to deliver both a first focused ultrasound wave and a second focused ultrasound wave to the touch 280 location. The first ultrasound wave has a first carrier frequency and amplitude sufficient to induce a non-linear vibrational response of the ultrasound-conducting layer 240. The second ultrasound wave has a second carrier frequency and amplitude sufficient to induce a non-linear vibrational response of the ultrasound-conducting layer. The parameters of the first carrier frequency and amplitude and second carrier frequency and amplitude are such that a non-linear interaction of the first ultrasound wave and the second ultrasound wave at the touch location produces a stress pattern directly perceivable or discernible by the human appendage. In this embodiment, the first focused ultrasound wave includes a first phase-conjugated focused ultrasound wave and the second focused ultrasound wave includes a second phase-conjugated focused ultrasound wave.

Figure 14:
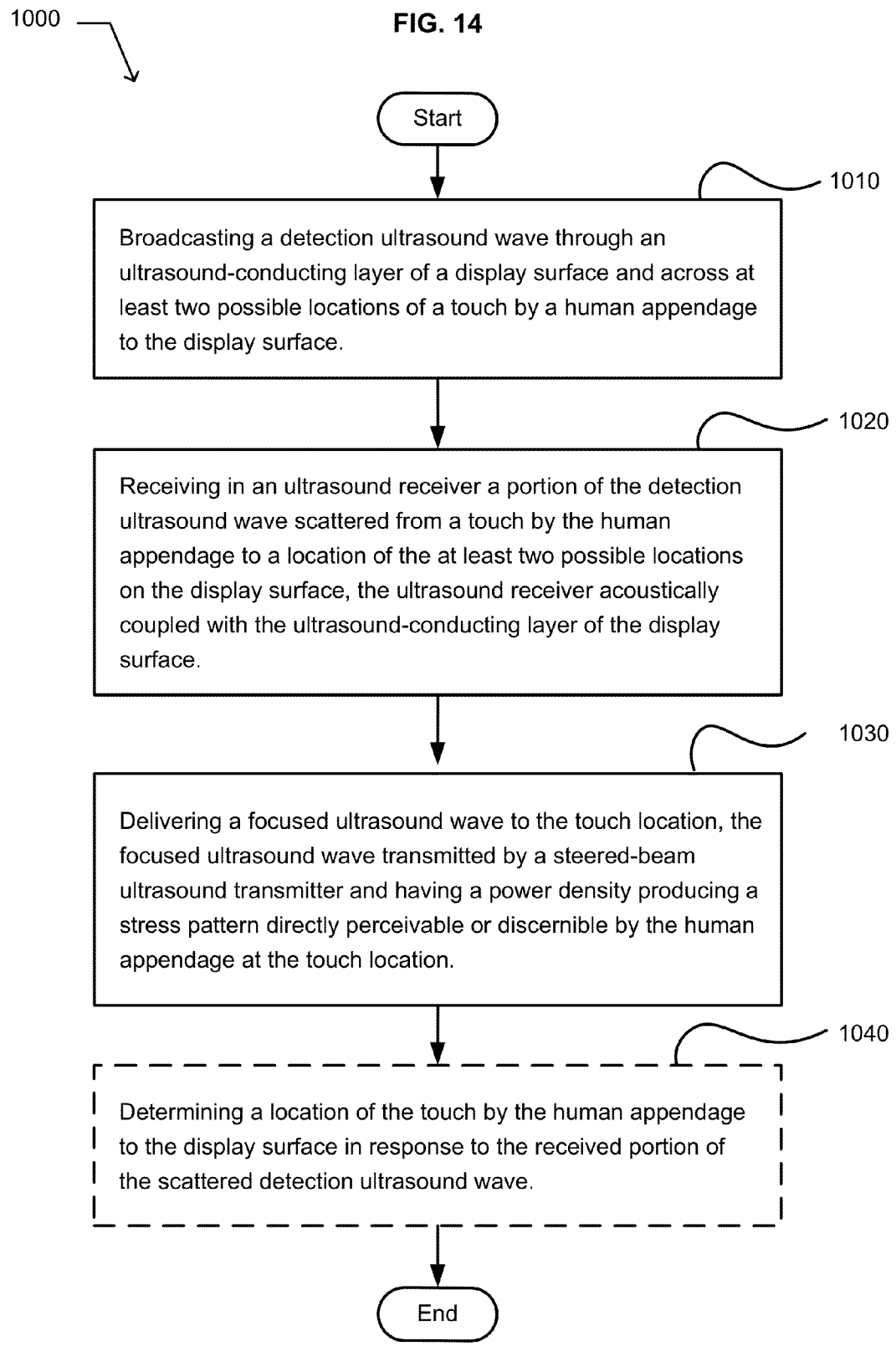
FIG. 14 illustrates an example operational flow 1000.

FIG. 14 illustrates an example operational flow 1000. After a start operation, the operational flow includes a pinging operation 1010. The pinging operation includes broadcasting a detection ultrasound wave through an ultrasound-conducting layer of a display surface and across at least two possible locations of a touch by a human appendage to the display surface. For example, the pinging operation may be implemented using the ultrasound locator transmitter 950 described in conjunction with FIG. 11. A reception operation 1020 includes receiving in an ultrasound receiver a portion of the detection ultrasound wave scattered from a touch by the human appendage to a location of the at least two possible locations on the display surface. The ultrasound receiver is acoustically coupled with the ultrasound-conducting layer of the display surface. In an embodiment, the reception operation may be implemented using the steered-beam ultrasound transducer 952 described in conjunction with FIG. 12. A tactile feedback operation 1030 includes delivering a focused ultrasound wave to the touch location. The focused ultrasound wave is transmitted by a steered-beam ultrasound transmitter and having a power density producing a stress pattern directly perceivable or discernible by the human appendage at the touch location. In an embodiment, the tactile feedback operation may be implemented using the steered-beam ultrasound transducer 952 described in conjunction with FIG. 13. The operational flow includes an end operation.

In an embodiment, the delivering a focused ultrasound wave 1030 includes delivering a down-modulated focused ultrasound wave. In an embodiment, delivering a focused ultrasound wave includes delivering a first focused ultrasound wave and delivering a second focused ultrasound wave delivered by the steered-beam ultrasound transmitter. The first delivered ultrasound wave having a first carrier frequency and amplitude sufficient to induce a non-linear vibrational response of the ultrasound-conducting layer. The second delivered ultrasound wave having a second carrier frequency and amplitude sufficient to induce a non-linear vibrational response of the ultrasound-conducting layer. The parameters of the first carrier frequency and amplitude, and second carrier frequency and amplitude, are such that a non-linear interaction of the first ultrasound wave and the second ultrasound wave at the touch location produces a stress pattern directly perceivable or discernible by the human appendage. In an embodiment, the operational flow 1040 includes determining a location of the touch by the human appendage to the display surface in response to the received portion of the scattered detection ultrasound wave.

FIGS. 11-13 illustrate another embodiment of the example system 900. The system includes the ultrasound locator transmitter 950 acoustically coupled with the ultrasound-conducting layer 240 of the display surface 210. The ultrasound locator transmitter is configured to broadcast a detection ultrasound wave 960 across at least a portion the ultrasound-conducting layer. The system includes a first steered-beam ultrasound transducer 952 is acoustically coupled with the ultrasound-conducting layer of the display surface. The first steered-beam ultrasound transducer is configured to receive a first portion 960.1S of the detection ultrasound wave scattered from a touch 280 by the human appendage to the display surface. The first steered-beam ultrasound transducer is configured to deliver a first focused ultrasound wave 962 to the touch location. The first focused ultrasound wave has a first carrier frequency and amplitude sufficient to induce a non-linear vibrational response of the ultrasound conducting layer. The system includes a second steered-beam ultrasound transducer 954 acoustically coupled with the ultrasound-conducting layer of the display surface. The second steered-beam ultrasound transducer is configured to receive a second portion 960.2S of the detection ultrasound wave scattered from the touch by the human appendage to the display surface. The second steered-beam ultrasound transducer is configured to deliver a second focused ultrasound wave 964 to the touch location. The second focused ultrasound wave has a second carrier frequency and amplitude sufficient to induce a non-linear vibrational response of the ultrasound conducting layer. FIG. 12 illustrates the first steered-beam ultrasound transducer receiving the first portion 960.1S of the detection ultrasound wave and the second steered-beam ultrasound transducer receiving the second portion 960.2S of the scattered detection ultrasound wave. FIG. 13 the first steered-beam ultrasound transducer delivering the first focused ultrasound wave 962 and the second steered-beam ultrasound transducer delivering the second focused ultrasound wave 964. The system includes the stimulation controller 972 configured to initiate a delivery of the first focused ultrasound wave and a delivery of the second focused ultrasound wave to the touch location. The parameters of the first carrier frequency and amplitude, and second carrier frequency and amplitude, are such that a non-linear interaction of the first focused ultrasound wave and the second focused ultrasound wave at the touch location produces a stress pattern directly perceivable or discernible by the human appendage.

In an embodiment, the first steered-beam ultrasound transducer 952 and the ultrasound locator transmitter 950 share at least one component. In an embodiment, the first steered-beam ultrasound transducer includes a first amplitude-patterned ultrasound transducer, and the second steered-beam ultrasound transducer includes a second amplitude-patterned ultrasound transducer. In an embodiment, the first steered-beam ultrasound transmitter includes a first phased-array ultrasound transmitter and the second steered-beam ultrasound transmitter includes a second phased-array ultrasound transmitter.

In an embodiment, the stimulation controller 972 is configured to initiate a delivery of a first focused, ultrasound wave 962 and a delivery of the second focused, ultrasound wave 964 to the touch location 280. The delivery is initiated in response to the reception of the first portion 960.1S of the scattered detection ultrasound wave or the reception of the second portion 960.2S of the scattered detection ultrasound wave 960.

In an embodiment, the first wave 962 propagates in a first direction toward the touch location 280 and the second wave 964 propagates in a second direction toward the touch location 280. The second direction is not co-aligned with the first direction. In an embodiment, the second steered-beam ultrasound transmitter is physically spaced-apart from the first steered-beam ultrasound transmitter. In an embodiment, the first focused ultrasound wave includes a first focused surface acoustic wave. In an embodiment, the second focused ultrasound wave includes a second focused surface acoustic wave.

In an embodiment, the system 900 includes the location circuit 970 configured to determine the touch 280 location in response the first received portion 960.1S of the scattered detection ultrasound wave or the second received portion 960.2S of the scattered detection ultrasound wave 960. In an embodiment, the stimulation controller 972 is configured to initiate a delivery of the first focused ultrasound wave 962 and of the second focused ultrasound wave 964 to the determined touch location, e.g., by computationally determining the proper excitation of the first steered-beam ultrasound transducer 952 and of the first steered-beam ultrasound transducer 954. In an embodiment, the system includes the scanning controller 974 configured to initiate the broadcast of the detection ultrasound wave.

Figure 15:
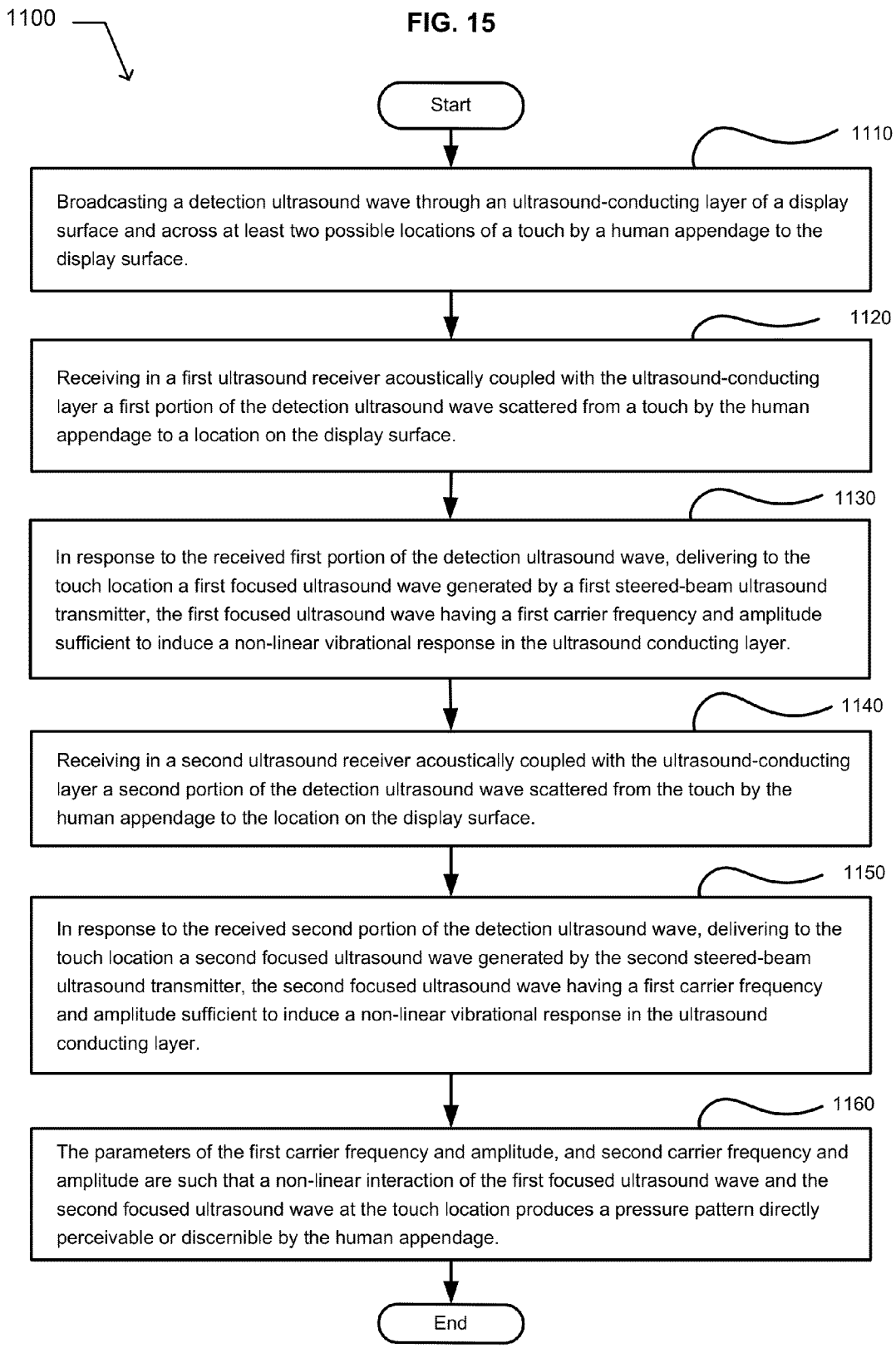
FIG. 15 illustrates an example operational flow 1100.

FIG. 15 illustrates an example operational flow 1100. After a start operation, the operational flow includes a pinging operation 1110. The pinging operation includes broadcasting a detection ultrasound wave through an ultrasound-conducting layer of a display surface and across at least two possible locations of a touch by a human appendage to the display surface. For example, the pinging operation may be implemented using the ultrasound locator transmitter 950 described in conjunction with FIG. 11. A first reception operation 1120 includes receiving in a first ultrasound receiver a first portion of the detection ultrasound wave scattered from a touch by the human appendage to a location on the display surface. The first ultrasound receiver is acoustically coupled with the ultrasound-conducting layer. In an embodiment, the first reception operation may be implemented using the steered-beam ultrasound transducer 952 described in conjunction with FIG. 12. A first tactile feedback operation 1130 includes, in response to the received first portion of the detection ultrasound wave, delivering to the touch location a first focused ultrasound wave generated by a first steered-beam ultrasound transmitter. The first focused ultrasound wave having a first carrier frequency and amplitude sufficient to induce a non-linear vibrational response in the ultrasound conducting layer. In an embodiment, the first tactile feedback operation may be implemented using the steered-beam ultrasound transducer 952 described in conjunction with FIG. 13. A second reception operation 1140 includes receiving in a second ultrasound receiver a second portion of the detection ultrasound wave scattered from the touch by the human appendage to the location on the display surface. The second ultrasound receiver is acoustically coupled with the ultrasound-conducting layer. In an embodiment, the second reception operation may be implemented using the steered-beam ultrasound transducer 954 described in conjunction with FIG. 12. A second tactile feedback operation 1150 includes, in response to the received second portion of the detection ultrasound wave, delivering to the touch location a second focused ultrasound wave generated by a second steered-beam ultrasound transmitter. The second focused ultrasound wave having a first carrier frequency and amplitude sufficient to induce a non-linear vibrational response in the ultrasound conducting layer. In an embodiment, the second tactile feedback operation may be implemented using the steered-beam ultrasound transducer 954 described in conjunction with FIG. 13. At operation 1160, the parameters of the first carrier frequency and amplitude, and second carrier frequency and amplitude, are such that a non-linear interaction of the first focused ultrasound wave and the second focused ultrasound wave at the touch location produces a stress pattern directly perceivable or discernible by the human appendage. The operational flow includes an end operation.

In an embodiment, the focused ultrasound wave propagates toward the touch location in a first direction, the second focused ultrasound wave propagates toward the touch location in a second direction, and the second direction is not co-aligned with the first direction. In an embodiment, the first steered-beam ultrasound transducer includes a first steered-beam ultrasound transducer array.

In an embodiment, the operational flow 1100 includes determining the touch location in response the first received portion of the scattered detection ultrasound wave or the second received portion of the scattered detection ultrasound wave.

Figure 16:
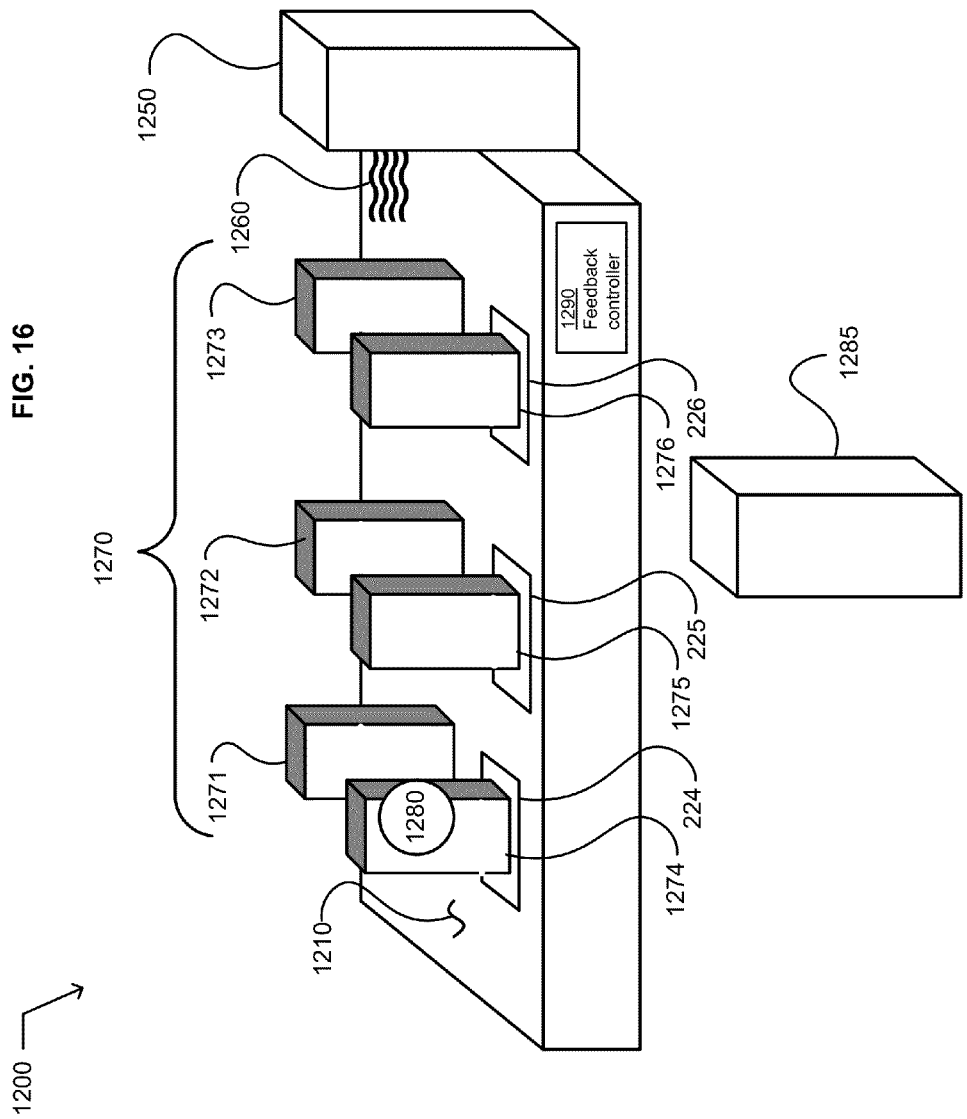
FIGS. 16 and 17 illustrate an example system 1200.
Figure 17:
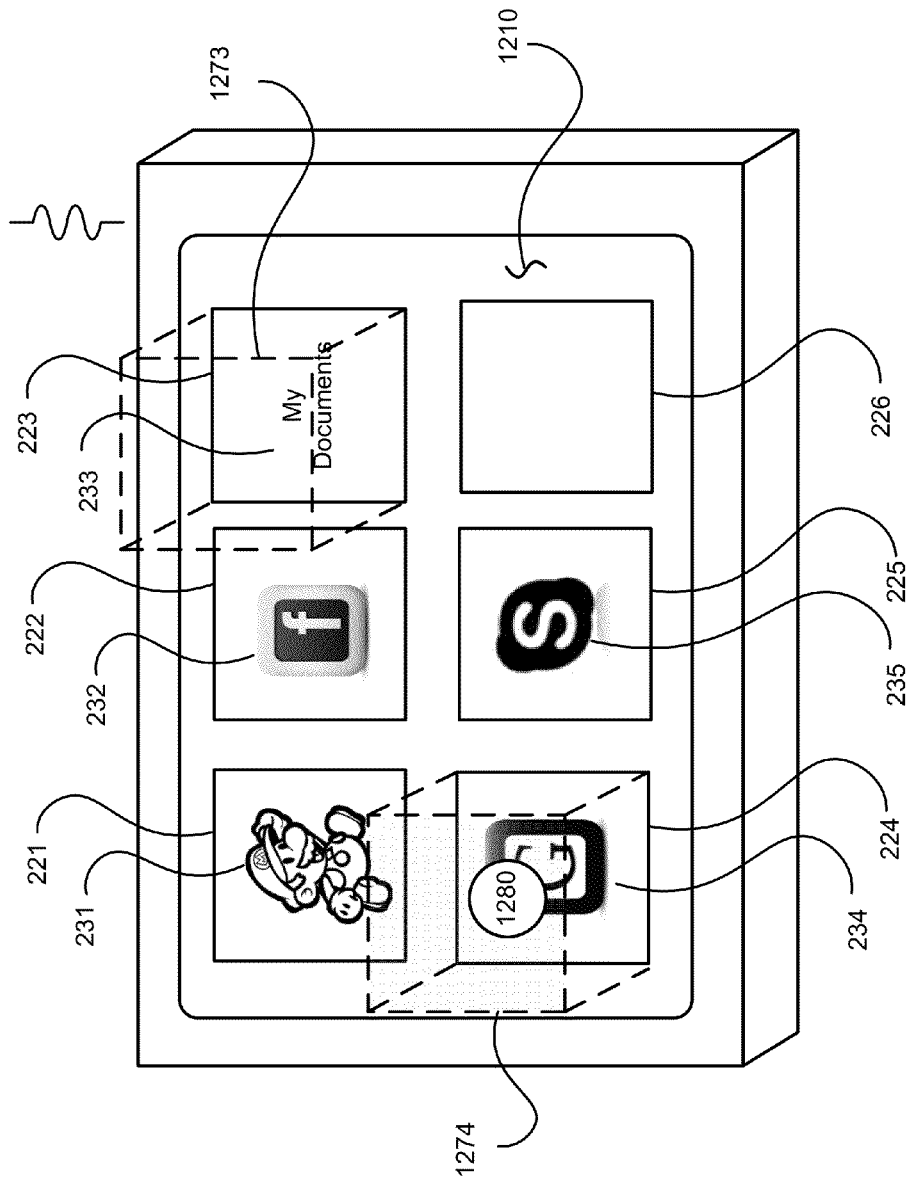

FIGS. 16-17 illustrate an example system 1200. FIG. 16 illustrates a surface 1210. At least two volumes of airspace 1270 are respectfully associated with at least two delineated areas of the surface. The at least two volumes of airspace are illustrated as volumes 1271-1276. For example, a volume of airspace 1274 is associated with the delineated area 224, a volume of airspace 1275 is associated with the delineated area 225, and a volume of airspace 1276 is associated with the delineated area 226. In an embodiment, the at least two volumes of airspace are respectfully spatially or proximately associated with the at least two delineated areas of the surface. In an embodiment, the at least two volumes of airspace 1270 respectfully extend from or are projected from the at least two delineated areas 221-226 of the surface 1210. In an embodiment, the surface includes a display surface.

FIG. 17 illustrates an embodiment of the display surface 1210 where widgets 231-235 are displayed within the delineated areas 221-225. Also illustrated are the volumes of airspace 1273 and 1274 respectfully associated with the delineated areas 223 and 224, and the widgets 233 and 234 respectfully displayed within those delineated areas.

Returning to FIG. 16, the system 1200 includes a steered-beam ultrasound transmitter 1250 configured to deliver a focused, down-modulated ultrasound wave 1260 into a volume of airspace selected from at least two volumes of airspace 1270 each respectfully associated with the at least two delineated areas of the surface 1210 illustrated as volumes of airspace 1274-1276 respectfully associated with delineated areas 224-226. The down-modulated ultrasound wave having a power density producing a stress pattern directly perceivable or discernible by a human appendage present 1280 in the selected volume of airspace. The system includes a feedback controller 1290 configured to select the volume of airspace in response to a presence of the human appendage within a particular volume of airspace of the at least two volumes of airspace. The feedback controller is also configured to initiate a delivery by the ultrasound transmitter of the down-modulated ultrasound wave into the selected volume of airspace.

In an embodiment, the ultrasound wave 1260 includes a longitudinal wave. In an embodiment, the stress pattern includes a pressure pattern. In an embodiment, the stress pattern includes an out-of-plane component or an in-plane component.

In an embodiment, the system 1200 includes a motion tracking device 1285 configured to detect a presence of the human appendage within the particular volume of airspace of at least two volumes of airspace. In an embodiment, the motion tracking device 1285 may include a camera or a probe. In an embodiment, the motion tracking device may include the position or motion tracking technology of the Wii Remote of the Wii® by Nintendo of America, Redmond, Wash. In an embodiment, the motion tracking device may include the position or motion tracking technology of the Kinect® by Microsoft, Redmond, Wash. In an embodiment, the motion tracking device may include the position or motion tracking technology of the Leap Motion Controller by Leap Motion, Inc., San Francisco, Calif.

Figure 18:
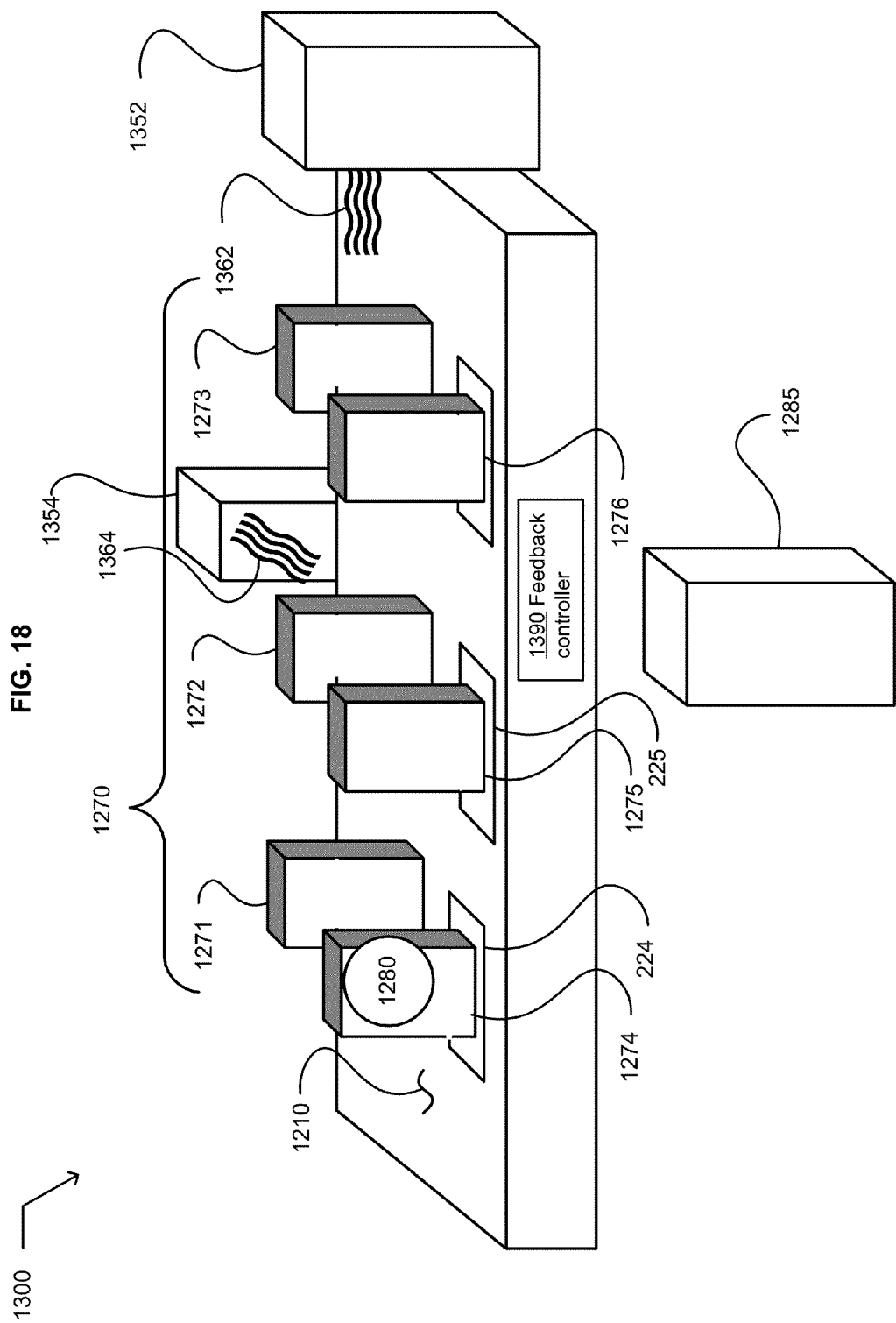
FIG. 18 illustrates an example system 1300.

FIG. 18 illustrates an example system 1300. The system includes a first steered-beam ultrasound transmitter 1352 configured to deliver a focused ultrasound wave 1362 into a volume of airspace selected from at least two volumes of airspace 1270 respectfully associated with at the least two delineated areas 221-226 of the surface 1210. The first focused ultrasound wave having a first carrier frequency and pressure amplitude sufficient to induce a non-linear vibrational response in the selected volume of airspace or in the human appendage. The system includes a second steered-beam ultrasound transmitter 1354 configured to deliver a second focused ultrasound wave 1364 into the selected volume of airspace. The second focused ultrasound wave having a second carrier frequency and pressure amplitude sufficient to induce a non-linear vibrational response in the selected volume of airspace or in the human appendage. The system includes a feedback controller 1390 configured to select the volume of airspace in response to a presence 1280 of the human appendage within a particular volume of airspace 1274 of the at least two volumes of airspace. The feedback controller is further configured to initiate a delivery of the first focused ultrasound wave and a delivery of the second focused ultrasound wave into the selected volume of airspace. The parameters of the first carrier frequency and pressure amplitude, and second carrier frequency and pressure amplitude, are such that a non-linear interaction of the first focused ultrasound wave and the second focused ultrasound wave at the selected volume of airspace or in the human appendage produces a stress pattern directly perceivable or discernible by the human appendage.

In an embodiment, the surface 1210 includes a display surface. In an embodiment, the surface includes a holographically displayed surface. In an embodiment, the first steered-beam ultrasound transmitter 1352 includes a first phased-array ultrasound transmitter and the second steered-beam ultrasound transmitter 1354 includes a second phased-array ultrasound transmitter. In an embodiment, the first steered-beam ultrasound transmitter includes a first amplitude-patterned ultrasound transmitter and the second steered-beam ultrasound transmitter includes a second amplitude-patterned ultrasound transmitter. In an embodiment, the elements of the second steered-beam ultrasound transmitter are interlaced with the elements of first steered-beam ultrasound transmitter. In an embodiment, the second steered-beam ultrasound transmitter is physically spaced-apart from the first steered-beam ultrasound transmitter. In an embodiment, the second steered-beam ultrasound transmitter is separate from the first steered-beam ultrasound transmitter. In an embodiment, the first focused ultrasound wave includes a first focused surface acoustic wave. In an embodiment, the second focused ultrasound wave includes a second focused surface acoustic wave.

In an embodiment, the system 1300 further includes the motion tracking device 1285 configured to detect a presence 1280 of the human appendage within a volume of airspace of the at least two volumes of airspace. In an embodiment, the first wave 1362 propagates in a first direction toward the selected volume of airspace, the second wave 1364 propagates in a second direction toward the selected volume of airspace, and the second direction is non-collinear with respect to the first direction. In an embodiment, the non-linear interaction of the first ultrasound wave and the second ultrasound wave within the selected volume of airspace or in the human appendage produces a beat-frequency stress pattern directly perceivable or discernible by the human appendage. In an embodiment, the non-linear interaction of the first ultrasound wave and the second ultrasound wave within the selected volume of airspace produces a 2-dimensional or 3-dimensional force or pressure field display directly perceivable or discernible by the human appendage.

FIG. 19 illustrates an example operational flow 1400. After a start operation, the operational flow includes a choosing operation 1410. The choosing operation includes selecting a volume of airspace from at least two volumes of airspace in response to a detected presence of a human appendage within a particular volume of airspace of the at least two volumes of airspace. Each volume of airspace is respectfully associated with a delineated area of the at least two delineated areas of a surface. In an embodiment, the choosing operation may be implemented using the feedback controller 1390 described in conjunction with FIG. 18. A first broadcast operation 1420 includes delivering a first ultrasound wave to the selected volume of airspace. The first ultrasonic wave having a first carrier frequency and pressure amplitude sufficient to induce a non-linear vibrational response in the selected volume of airspace or in the human appendage. In an embodiment, the first broadcast operation may be implemented using the first steered-beam ultrasound transmitter 1352 described in conjunction with FIG. 18. A second broadcast operation 1430 includes delivering a second ultrasound wave to the selected volume of airspace. The second ultrasonic wave having a second carrier frequency and pressure amplitude sufficient to induce a non-linear vibrational response in the selected volume of airspace or in the human appendage. In an embodiment, the second broadcast operation may be implemented using the second steered-beam ultrasound transmitter 1354 described in conjunction with FIG. 18. At operation 1440, the parameters of the first carrier frequency and amplitude and second carrier frequency and amplitude are such that a non-linear interaction of the first ultrasound wave and the second ultrasound wave at the selected delineated area produces a stress pattern tactilely perceivable or discernible by the human appendage. The operational flow includes an end operation.

In an embodiment, the first ultrasound wave is transmitted by a first steered-beam ultrasound transmitter configured to deliver the first focused ultrasound wave into the volume of airspace selected from the at least two volumes of airspace. In an embodiment, the second ultrasound wave is transmitted by a second steered-beam ultrasound transmitter configured to deliver the second focused ultrasound wave into the volume of airspace selected from the at least two volumes of airspace. In an embodiment, the second steered-beam ultrasound transmitter physically spaced-apart from the first steered-beam ultrasound transmitter.

In an embodiment, the operational flow 1400 includes detecting 1450 the presence of the human appendage within a particular volume of airspace of at least two volumes of airspace.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
    an ultrasound transmitter acoustically coupled to an ultrasound-conducting layer of a display surface and configured to deliver a down-modulated ultrasound wave to a first delineated area of at least two delineated areas of the display surface, the down-modulated ultrasound wave having a power density producing a stress pattern directly perceivable or discernible by a human appendage touching the first delineated area; and
    a controller configured to initiate a delivery of the down-modulated ultrasound wave to the first delineated area by the ultrasound transmitter in response to an indication of a detected touch by the human appendage to at least a portion of the first delineated area.

2. The system of claim 1, wherein the display surface includes a touch screen display surface.

3. The system of claim 1, wherein the display surface includes a dynamic display surface.

4. The system of claim 1, wherein the display surface includes a static display surface.

5. The system of claim 1, wherein the ultrasound wave includes a longitudinal wave or a shear wave.

6. The system of claim 1, wherein the down-modulated ultrasound wave includes a down-modulated surface acoustic wave.

7. The system of claim 1, wherein the down-modulated ultrasound wave includes a frequency-downshifted modulated ultrasound wave.

8. The system of claim 7, wherein the frequency-downshifted modulated ultrasound wave includes at least one frequency component lower than a primary carrier frequency of the ultrasound wave.

9. The system of claim 1, wherein the down-modulated ultrasound wave is configured to deliver a selected tactile sensation in the human appendage.

10. The system of claim 1, wherein the down-modulated ultrasound wave includes an ultrasound wave having a modulation parameter selected in response to the particular part of the human appendage touching the display surface.

11. The system of claim 1, wherein the first delineated area substantially corresponds to the touch location of the human appendage.

12. The system of claim 1, wherein the power density of the ultrasound wave within the first delineated area is greater than that within a second delineated area.

13. The system of claim 1, wherein the ultrasound transmitter includes a phased-array ultrasound transmitter.

14. The system of claim 1, wherein the ultrasound transmitter includes an amplitude-patterned ultrasound transmitter.

15. The system of claim 1, wherein the controller includes a controller configured to (i) receive an indication of a detected touch to at least a portion of the first delineated area, (ii) retrieve or select a down-modulation pattern from a lookup table responsive to the indication of the detected touch, and (iii) initiate a delivery to the first delineated area of the down-modulated ultrasound wave by the ultrasound transmitter, the ultrasound wave down-modulated in response to the retrieved or selected modulation pattern.

16. The system of claim 15, wherein the controller is further configured to select an aspect of the modulation pattern from a lookup table responsive to the indication of the detected touch.

17. The system of claim 1, wherein the down-modulated ultrasound wave includes a down-modulated ultrasonic wave having a power density producing a haptic stimulation directly perceivable or discernible by a human appendage touching the first delineated area.

18. The system of claim 1, further comprising:
    a touch tracking device configured to detect a touch by the human appendage to at least a portion of the first delineated area.

19. The system of claim 18, wherein the touch tracking device is further configured to report a location of the detected touch.

20. The system of claim 18, wherein the touch tracking device includes an ultrasound transceiver.

21. The system of claim 1, wherein the ultrasound transmitter includes:
    a first ultrasound transmitter acoustically coupled to an ultrasound-conducting layer of a display surface and configured to deliver a first down-modulated ultrasound wave to a first delineated area of at least two delineated areas of the display surface, the first down-modulated ultrasound wave having a power density producing a first stress pattern directly perceivable or discernible by a human appendage touching the first delineated area; and a second ultrasound transmitter acoustically coupled to the ultrasound-conducting layer of the display surface and configured to deliver a second down-modulated ultrasound wave to a second delineated area of the at least two delineated areas of the display surface, the second down-modulated ultrasound wave having a power density producing a second stress pattern directly perceivable or discernible by the human appendage touching the second delineated area.

22. The system of claim 21, wherein the controller includes a controller configured to (i) initiate a delivery of the first down-modulated ultrasound wave to the first delineated area by the first ultrasound transmitter in response to an indication of a first detected touch by the human appendage to at least a portion of the first delineated area, or (ii) initiate a delivery of the second down-modulated ultrasound wave to the second delineated area by the second ultrasound transmitter in response to an indication of a second detected touch by the human appendage to at least a portion of the second delineated area.

23. The system of claim 21, wherein the first stress pattern produces a first humanly perceivable or discernible effect on the human appendage and the second stress pattern produces a second and different humanly perceivable or discernible effect on the human appendage.

24. The system of claim 21, further comprising:
a third ultrasound transmitter acoustically coupled to the ultrasound-conducting layer of a display surface and configured to deliver a third down-modulated ultrasound wave to a third delineated area of the display surface, the third down-modulated ultrasound wave having a power density producing a stress pattern directly perceivable or discernible by the human appendage touching the third delineated area.

25. The system of claim 24, wherein the controller is further configured to (i) initiate a delivery of the first down-modulated ultrasound wave to the first delineated area by the first ultrasound transmitter in response to an indication of a first detected touch by the human appendage to at least a portion of the first delineated area, or (ii) initiate a delivery of the second down-modulated ultrasound wave to the second delineated area by the second ultrasound transmitter in response to an indication of a second detected touch by the human appendage to at least a portion of the second delineated area, or (iii) initiate a delivery of the third down-modulated ultrasound wave to the third delineated area by the third ultrasound transmitter in response to an indication of a third detected touch by the human appendage to at least a portion of the third delineated area.

26. The system of claim 24, wherein the first stress pattern produces a first directly perceivable or discernible effect on the human appendage, the second stress pattern produces a second and different directly perceivable or discernible effect on the human appendage, and the third stress pattern produces a third and further different directly perceivable or discernible effect on the human appendage.

27. A method comprising:
detecting a first touch by a first human appendage to at least a portion of a first delineated area of a display surface having at least two delineated areas; and
activating a first ultrasound transmitter acoustically coupled to an ultrasound-conducting layer of the display surface and configured to deliver a first down-modulated ultrasound wave to the first delineated area, the first down-modulated ultrasound wave having a first power density producing a stress pattern directly perceivable or discernible by the first human appendage touching the first delineated area.

28. The method of claim 27, further comprising:
retrieving or selecting the down-modulation pattern from a lookup table in response to the detected touch.

29. The method of claim 27, further comprising:
detecting a second touch by a second human appendage to at least a portion of a second delineated area of the display surface; and
activating a second ultrasound transmitter coupled to the ultrasound-conducting layer and configured to deliver a second down-modulated ultrasound wave to the second delineated area, the second down-modulated ultrasound wave having a second power density producing second stress pattern directly perceivable or discernible by the second human appendage touching the second delineated area.

30. The method of claim 29, wherein the first down-modulated ultrasound wave and the second down-modulated ultrasound wave are delivered simultaneously or sequentially.

\* \* \* \* \*

UNITED STATES PATENT AND TRADEMARK OFFICE
CERTIFICATE OF CORRECTION

| | | |
|---|---|---|
| PATENT NO. | : 8,766,953 B1 | Page 1 of 1 |
| APPLICATION NO. | : 13/929337 | |
| DATED | : July 1, 2014 | |
| INVENTOR(S) | : Jesse R. Cheatham, III et al. | |

It is certified that error appears in the above-identified patent and that said Letters Patent is hereby corrected as shown below:

In the Specification

At Column 1, Lines 35-37, please replace "TACTILE FEEDBACK GENERATED BY NON-LINEAR INTERACTION OF SURFACE ACOUSTIV WAVES" with --TACTILE FEEDBACK GENERATED BY NON-LINEAR INTERACTION OF SURFACE ACOUSTIC WAVES--

Signed and Sealed this
Second Day of September, 2014

Michelle K. Lee
*Deputy Director of the United States Patent and Trademark Office*